(12) United States Patent
Khan et al.

(10) Patent No.: US 8,451,915 B2
(45) Date of Patent: May 28, 2013

(54) EFFICIENT UPLINK FEEDBACK IN A WIRELESS COMMUNICATION SYSTEM

(75) Inventors: Farooq Khan, Allen, TX (US); Zhouyue Pi, Richardson, TX (US)

(73) Assignee: Samsung Electronics Co., Ltd., Suwon-Si (KR)

(*) Notice: Subject to any disclaimer, the term of this patent is extended or adjusted under 35 U.S.C. 154(b) by 500 days.

(21) Appl. No.: 11/907,944

(22) Filed: Oct. 18, 2007

(65) Prior Publication Data

US 2008/0232449 A1  Sep. 25, 2008

Related U.S. Application Data

(60) Provisional application No. 60/919,311, filed on Mar. 21, 2007.

(51) Int. Cl.
*H04K 1/10* (2006.01)
*H04L 27/28* (2006.01)

(52) U.S. Cl.
USPC ........... 375/260; 375/220; 375/267; 370/204; 370/335

(58) Field of Classification Search
USPC .................. 375/220, 260; 370/204, 329, 330, 370/335
See application file for complete search history.

(56) References Cited

U.S. PATENT DOCUMENTS

| | | | |
|---|---|---|---|
| 6,400,703 B1 | 6/2002 | Park et al. | |
| 6,574,593 B1 | 6/2003 | Gao et al. | |
| 2002/0150069 A1* | 10/2002 | Jou et al. | 370/335 |
| 2006/0018374 A1 | 1/2006 | Nelson et al. | |
| 2007/0047485 A1 | 3/2007 | Gorokhov et al. | |
| 2007/0260956 A1* | 11/2007 | Terry et al. | 714/748 |
| 2007/0265016 A1* | 11/2007 | Kahtava et al. | 455/452.2 |
| 2008/0075195 A1* | 3/2008 | Pajukoski et al. | 375/298 |
| 2008/0084845 A1* | 4/2008 | Kuchibhotla et al. | 370/331 |
| 2008/0095252 A1* | 4/2008 | Kim et al. | 375/260 |
| 2008/0219236 A1* | 9/2008 | Love et al. | 370/347 |

FOREIGN PATENT DOCUMENTS

| | | |
|---|---|---|
| CA | 2 606 371 A1 | 11/2006 |
| CA | 2606371 | 11/2006 |
| CN | 1245706 C | 3/2006 |
| RU | 2197786 C2 | 1/2003 |
| WO | WO 2005/050852 | 6/2005 |
| WO | WO 2006/013729 | 2/2006 |
| WO | WO 2006/137708 A1 | 12/2006 |

OTHER PUBLICATIONS

*International Search report* from the Korean Intellectual Property Office issued in Applicant's corresponding International Patent Application No. PCT/KR2008/001421 dated Jun. 17, 2008.
Canadian Office Action dated May 16, 2012 in connection with Canadian Patent Application No. 2,680,710, 4 pages.
Barreto. et al.; "Capacity Increase in the Downlink of Spread Spectrum Systems through Joint Signal Precoding" Dresden University of Technology, Mobile Communications Systems, D-01062, Dresden, Germany, Jun. 2001, 5 pages.
TSG-RAN WG1 Meeting; Athens, Greece, R1-060793, "Indication of combination between L1/L2 control signaling and uplink data" Mar. 27-31, 2006, 3 pages.

(Continued)

*Primary Examiner* — Sam K Ahn
*Assistant Examiner* — Freshteh N Aghdam

(57) ABSTRACT

A method for transmitting control information by transmitting a reference signal from a first transceiver to a second transceiver, in response to the reception of the reference signal, determining at the second transceiver a plurality of control channel elements based upon the received reference signal, jointly encoding the plurality of control channel elements at the second transceiver to generate a control signal, and transmitting the control signal from the second transceiver to the first transceiver.

15 Claims, 23 Drawing Sheets

OTHER PUBLICATIONS

TSG-RAN WG1 #48; St Louis, MO, R1-071033, "Uplink Non-data Associated control Signaling: Multiplexing from the same" Feb. 12-16, 2007, 3 pages.

Translated Text of the Second Office Action dated Nov. 15, 2012 in connection with Chinese Patent Application No. 200880009039.2, 15 pages.

Canadian Office Action dated Feb. 28, 2013 in connection with Canadian Patent Application No. 2,680,710, 4 pages.

Barreto, et al.; "Capacity Increase in the Downlink of Spread Spectrum Systems through Joint Signal Precoding"; IEEE International Conference on Communications, Jun. 2001, vol. 4, 5 pages.

* cited by examiner

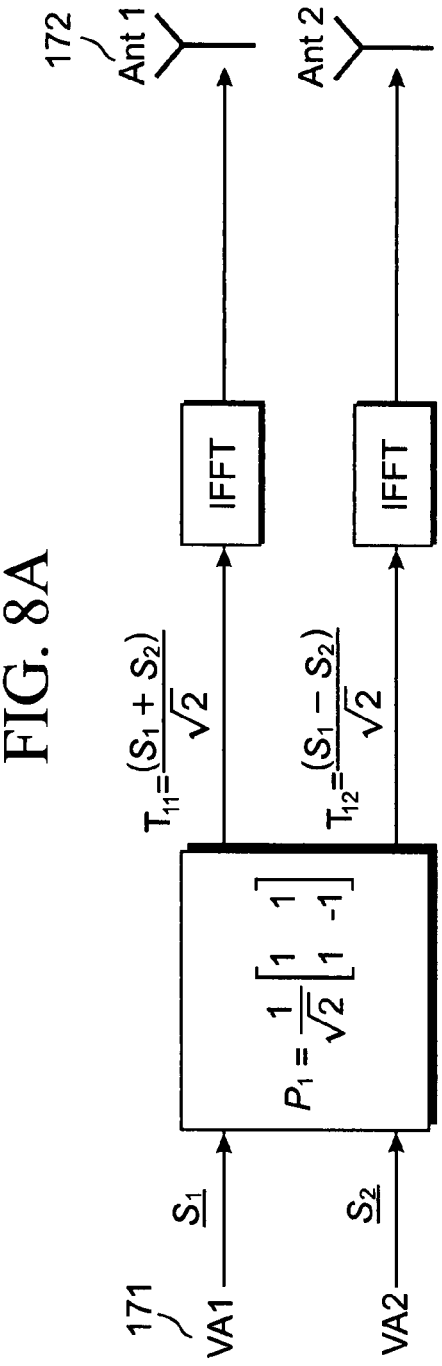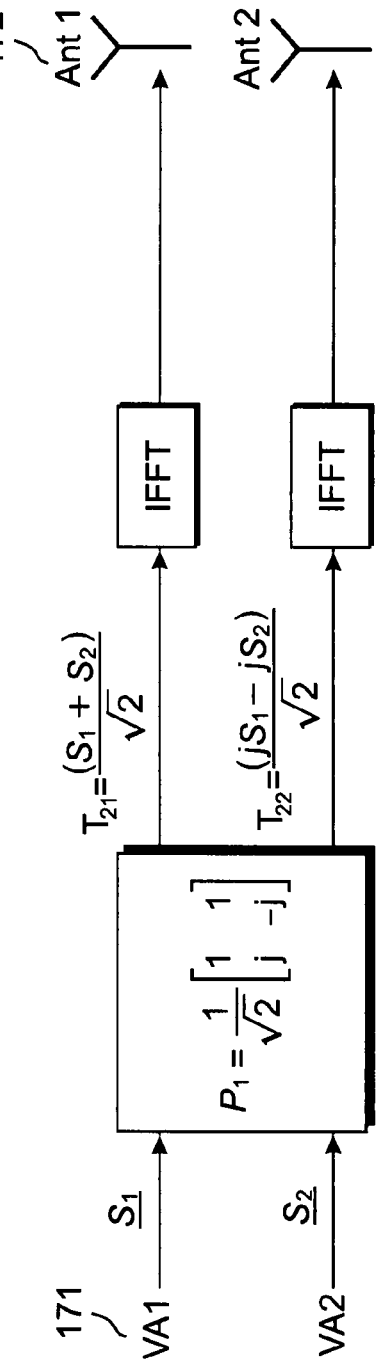

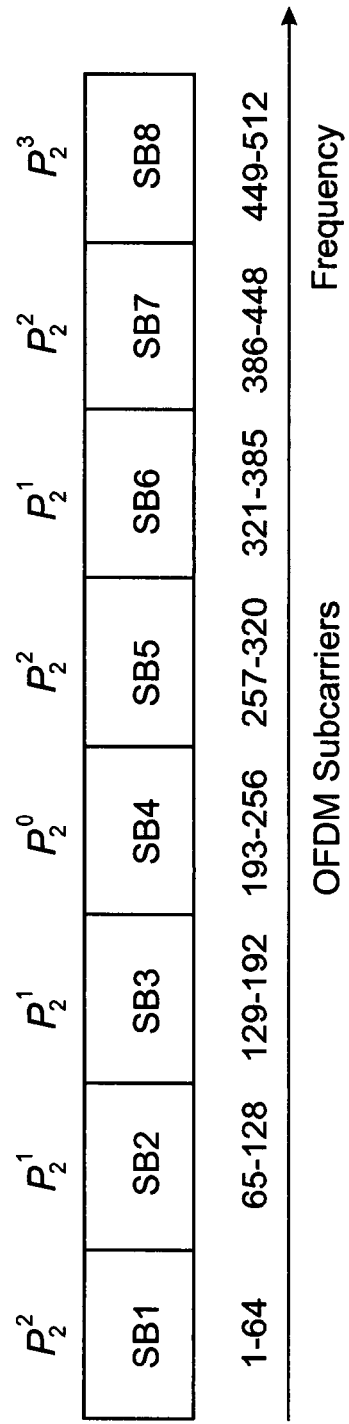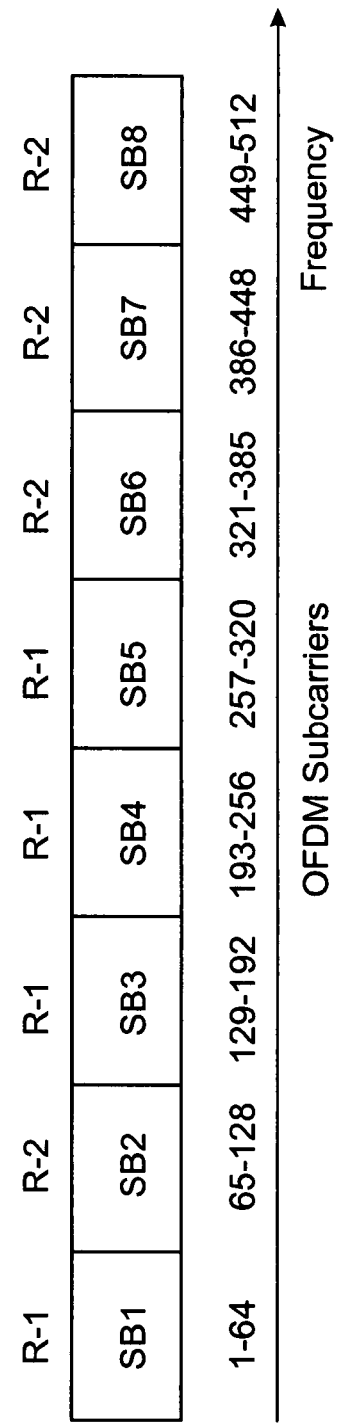

EFFICIENT UPLINK FEEDBACK IN A WIRELESS COMMUNICATION SYSTEM

CLAIM OF PRIORITY

This application makes reference to, incorporates the same herein, and claims all benefits accruing under 35 U.S.C. §119 from a provisional application earlier filed in the U.S. Patent & Trademark Office on 21 Mar. 2007 and there duly assigned Ser. No. 60/919,311.

BACKGROUND OF THE INVENTION

1. Field of the Invention

The present invention relates to a method for control channel transmission in a wireless communication system, and more specifically, a method for coding and mapping control channel information in a wireless communication system.

2. Description of the Related Art

Orthogonal Frequency Division Multiplexing (OFDM) is a popular wireless communication technology to multiplex data in frequency domain.

In a communication system, a multi-path communication channel results in a frequency-selective fading. Moreover, in a mobile wireless environment, the channel also results in a time-varying fading. Therefore, in a wireless mobile system employing OFDM, the overall system performance and efficiency can be improved by using, in addition to time-domain scheduling, frequency-selective multi-user scheduling. In case of frequency-selective multi-user scheduling, a contiguous set of subcarriers potentially experiencing an upfade is allocated for transmission to a user. Upfade is a situation where multipath conditions cause a radio signal to gain strength. The total bandwidth is divided into multiple subbands, and each subband contains multiple contiguous subcarriers.

A multiple antenna communication system, which is often referred to as multiple input multiple output (MIMO) system, is widely used in combination with OFDM technology, in a wireless communication system to improve system performance.

In a MIMO system, both transmitter and receiver are equipped with multiple antennas. Therefore, the transmitter is capable of transmitting independent data streams simultaneously in the same frequency band. Unlike traditional means of increasing throughput (i.e., the amount of data transmitted per time unit) by increasing bandwidth or increasing overall transmit power, MIMO technology increases the spectral efficiency of a wireless communication system by exploiting the additional dimension of freedom in the space domain due to multiple antennas. Therefore MIMO technology can significantly increase the throughput and range of the system.

When the transmission channels between the transmitters and the receivers are relatively constant, it is possible to use a closed-loop MIMO scheme to further improve system performance. In a closed-loop MIMO system, the receiver informs the transmitter of feedback information regarding the channel condition. The transmitter utilizes this feedback information, together with other considerations such as scheduling priority, data and resource availability, to optimize the transmission scheme.

A popular closed-loop MIMO scheme is MIMO precoding. With precoding, the data streams to be transmitted are precoded, i.e., pre-multiplied by a precoding matrix, before being passed on to the multiple transmit antennas in a transmitter.

In a contemporary closed-loop MIMO precoding scheme, when a transmitter precodes data before transmitting the data to a receiver, the transmitter informs the receiver of the precoding information such as an identification of the precoding matrix by transmitting explicit control information that carries the precoding information. A significant problem with this approach is that the control information inefficiently consumes a significant amount of system resources and degrades the overall system throughput and capacity.

In packet-based wireless data communication systems, a so-called control channel usually accompanies the data transmission. In the third Generation Long Term Evolution (3G LTE) system, the control channel that carries the control signal is referred to as Physical Downlink Control Channel (PDCCH) for transmission from a base station to a unit of user equipment, or Physical Uplink Control Channel (PUCCH) for transmission from a unit of user equipment to a base station. The PDCCH carries information such as user equipment (UE) ID, resource assignment information, Payload size, modulation, Hybrid Automatic Repeat-reQuest (ARQ) HARQ information, MIMO related information. A Cyclic Redundancy check calculated over the control information and masked by the UE ID can be carrier instead of explicit UE ID.

The different types of feedback information from the UE carried in PUCCH are summarized below:
Subbands CQI Information
MIMO Rank
Antenna/Layer selection
MIMO Precoding
ACK/NACK for downlink data transmission Contemporarily, each type of feedback control information is separately coded or modulated and transmitted. This results in inefficient transmission because efficient coding across multiple control types cannot be employed. Moreover, if some type of CRC is used for error detection purposes, separate CRCs are required for each of the control information types resulting in excessive overhead.

SUMMARY OF THE INVENTION

It is therefore an object of the present invention to provide an improved method and apparatus for transmission of control channel information.

It is another object of the present invention to provide an improved method and apparatus for control channel transmission to efficiently utilize transmission resources.

According to one aspect of the present invention, a method for transmitting control channel information may include transmitting a reference signal from a first transceiver to a second transceiver; in response to the reception of the reference signal, determining at the second transceiver a plurality of control channel elements based upon the received reference signal; jointly encoding the plurality of control channel elements at the second transceiver to generate a control signal; and transmitting the control signal from the second transceiver to the first transceiver.

The plurality of control channel elements may include a subband channel quality indicator, an indicator for multiple input and multiple output rank and selected layers, an indicator for multiple input and multiple output preceding, an indicator for acknowledgement or negative acknowledgement, and an indicator for cyclic redundancy check.

When four antennas are used by the first transceiver, the indicator for multiple input and multiple output rank and selected layers may be formed with four bits. When two antennas are used by the first transceiver, the indicator for multiple input and multiple output rank and selected layers may carry two bits.

The method may further include presetting an indicator for multiple input and multiple output rank and selected layers. In this case, the plurality of control channel elements may include a subbands channel quality indicator, a format indicator, an indicator for multiple input and multiple output precoding, an indicator for acknowledgement or negative acknowledgement, and a cyclic redundancy check indicator.

The method may further include presetting an indicator for multiple input and multiple output precoding. In this case, the plurality of control channel elements may include a subbands channel quality indicator, a format indicator, an indicator for multiple input and multiple output rank and selected layers, an indicator for acknowledgement or negative acknowledgement, and a cyclic redundancy check indicator.

The method may further include presetting a subbands channel quality indicator. In this case, the plurality of control channel elements may include a format indicator, an indicator for multiple input and multiple output rank and selected layers, an indicator for multiple input and multiple output precoding, an indicator for acknowledgement or negative acknowledgement, and a cyclic redundancy check indicator.

The plurality of control channel elements may be jointly encoded by inserting a selected set of tail bits into the plurality of control channel elements; encoding the tail bits inserted control channel elements using a selected code; puncturing the encoded control channel elements; modulating the punctured control channel elements to generated a plurality of equal-length modulated symbols using a selected modulation scheme; modulating a selected sequence using the modulated symbols to generated a plurality of modulated sequences; mapping the plurality of modulated sequences into available transmission resources; and converting the mapped symbols to radio frequency signals.

The selected code may be one selected from a group comprising convolutional codes, tail-biting convolutional codes and block codes.

The selected modulation scheme may be one selected from a group comprising Quadrature Phase-Shift Keying (QPSK), Binary Phase Shift Keying (BPSK), and Quadrature Amplitude Modulation (QAM).

Each of the modulated sequences may be a Constant Amplitude Zero AutoCorrelation (CAZAC) sequence.

The plurality of modulated sequences may be mapped into the available transmission resources by dividing the available transmission resources into a plurality of equal duration resource elements in time and frequency domain, with each resource element formed with a plurality of subcarriers, and the number of subcarriers in each resource element being equal to the length of each of the plurality of modulated sequences; selecting two sets of resource elements in a time-domain subframe for control channel transmission, with the number of resource elements in the two sets of resource elements being equal to the number of the plurality of modulated sequences, with a first set of resource elements being located in one edge of the subframe in time and frequency domain, and a second set of resource elements being located in the opposite edge of the subframe in time and frequency domain; and mapping the plurality of modulated sequences into the two sets of resource elements.

The plurality of modulated sequences may be mapped into the available transmission resources by dividing the available transmission resources into a plurality of equal duration resource elements in time and frequency domain, with each resource element formed with a plurality of subcarriers, and the number of subcarriers in each resource element being equal to the length of each of the plurality of modulated sequences; selecting a plurality of continuous time-domain subframes for control channel transmission, selecting two sets of resource elements in each time-domain subframe, with a first set of resource elements being located in one edge of the subframe in time and frequency domain, and a second set of resource elements being located in the opposite edge of the subframe in time and frequency domain, and the relationship between the number of resource elements in the two sets of resource elements in each selected subframe the number of the plurality of modulated sequences being established by:

$$M = X \times N$$

where M is the number of the modulated sequences, X is the number of the selected subframe, and N is the number of resource elements in the two sets of resource elements is each selected subframe; and mapping the plurality of modulated sequences into the selected resource elements in the selected subframes.

The plurality of modulated sequences may be mapped into the available transmission resources by dividing the available transmission resources into a plurality of equal duration resource elements in time and frequency domain, with each resource element formed with Y subcarriers, the length of each of the plurality of modulated sequences being Z, and Y/Z=B, where B is a positive integer; selecting two sets of resource elements in a time-domain subframe for control channel transmission, the number of resource elements in the two sets of resource elements equals to the number of the plurality of modulated sequences, with a first set of resource elements being located in one edge of the subframe in time and frequency domain, and a second set of resource elements being located in the opposite edge of the subframe in time and frequency domain; and mapping the plurality of modulated sequences into the two sets of resource elements, with each resource element corresponding to B modulated sequences.

Alternatively, the plurality of control channel elements may be jointly encoded by inserting a selected set of tail bits into the plurality of control channel elements; encoding the tail bits inserted control channel elements using a selected code; puncturing the encoded control channel elements; modulating the punctured control channel elements to generated a plurality of equal-length modulated symbols using a selected modulation scheme; mapping the plurality of modulated symbols into available transmission resources; and converting the mapped symbols to radio frequency signals.

The plurality of modulated symbols may be mapped into the available transmission resources by dividing the available transmission resources into a plurality of equal duration resource elements in time and frequency domain, with each resource element corresponding to one subcarrier; selecting two sets of resource elements in a time-domain subframe for control channel transmission, with a first set of resource elements being located in one edge of the subframe in time and frequency domain, and a second set of resource elements being located in the opposite edge of the subframe in time and frequency domain, and the number of resource elements in the two sets of resource elements in the subframe equals to the number of the plurality of modulated symbols; and mapping the plurality of modulated symbols into the two sets of resource elements.

According to another aspect of the present invention, a transmitter may be constructed with a control information generator that generates a plurality of control elements; a tail bit insertion unit that inserts a selected set of tail bits into the plurality of control channel elements; a coding unit that encodes the control channel elements using a selected code; a puncturing unit that punctures the encoded control channel elements; a first modulator that modulates the punctured control channel elements to generated a plurality of modulated symbols using a selected modulation scheme; a mapping unit that maps the plurality of control elements into available transmission resources; a upconversion unit that converts the mapped symbols to radio frequency signals; at least one antenna coupled to transmit the radio frequency signals.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 8A and FIG. 8B are examples of precoding in a precoding MIMO-system suitable for the practice of the principles of the present invention;

FIG. 9 is an illustration of an example of MIMO precoding on different subbands suitable for the practice of the principles of the present invention;

FIG. 10 is an illustration of an example of MIMO rank on different subbands suitable for the practice of the principles of the present invention;

DETAILED DESCRIPTION OF THE INVENTION

Figure 1:
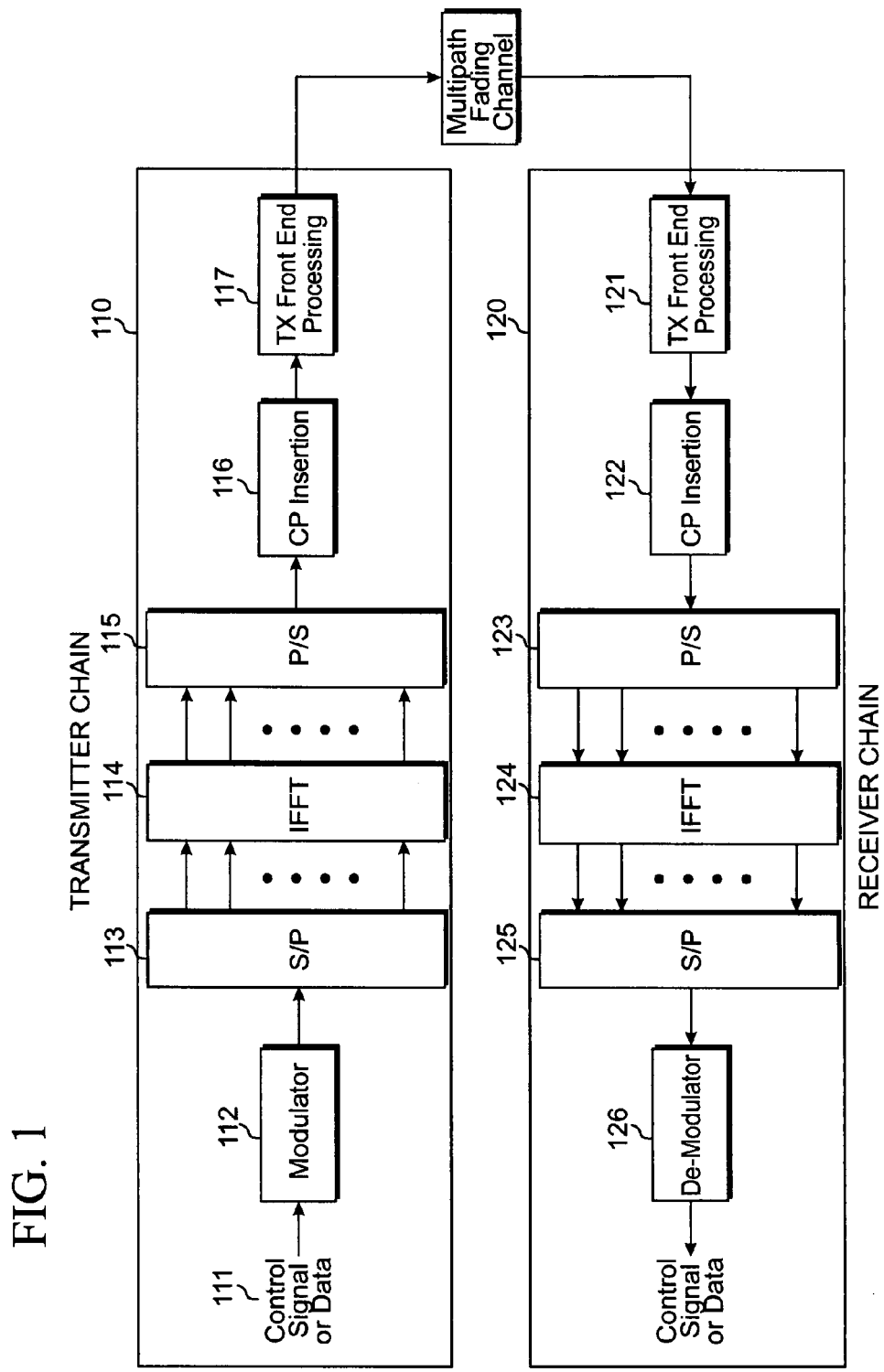
FIG. 1 is an illustration of an Orthogonal Frequency Division Multiplexing (OFDM) transceiver chain suitable for the practice of the principles of the present invention.

FIG. 1 illustrates an Orthogonal Frequency Division Multiplexing (OFDM) transceiver chain. In a communication system using OFDM technology, at transmitter chain 110, control signals or data 111 is modulated by modulator 112 and is serial-to-parallel converted by Serial/Parallel (S/P) converter 113. Inverse Fast Fourier Transform (IFFT) unit 114 is used to transfer the signal from frequency domain to time domain. Cyclic prefix (CP) or zero prefix (ZP) is added to each OFDM symbol by CP insertion unit 116 to avoid or mitigate the impact due to multipath fading. Consequently, the signal is transmitted by transmitter (Tx) front end processing unit 117, such as an antenna (not shown), or alternatively, by fixed wire or cable. At receiver chain 120, assuming perfect time and frequency synchronization are achieved, the signal received by receiver (Rx) front end processing unit 121 is processed by CP removal unit 122. Fast Fourier Transform (FFT) unit 124 transfers the received signal from time domain to frequency domain for further processing.

The total bandwidth in an OFDM system is divided into narrowband frequency units called subcarriers. The number of subcarriers is equal to the FFT/IFFT size N used in the system. In general, the number of subcarriers used for data is less than N because some subcarriers at the edge of the frequency spectrum are reserved as guard subcarriers. In general, no information is transmitted on guard subcarriers.

Figure 2:
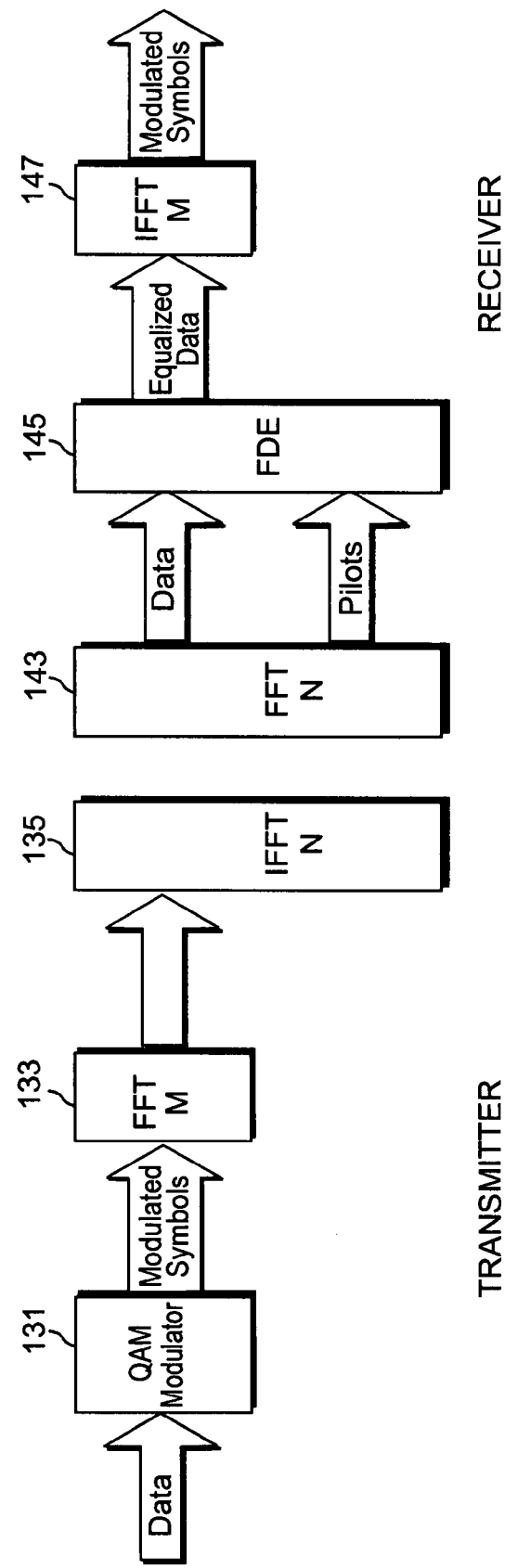
FIG. 2 is a block diagram of a transmitter and a receiver for a discreet Fourier transform (DFT) spread orthogonal frequency division multiplexing system.

In a DFT-spread OFDM system, the data to be transmitted is first modulated by a QAM Modulator 131. The QAM modulated symbols are FFT-pre-coded by a FFT unit 133 before mapping into IFFT unit 135 as shown in FIG. 2. The subsequent signal processing is similar to the transmitter in the example as shown in FIG. 1, and thus the explanation thereof is omitted. At the receiver, the received signal is processed similarly as in the receiver shown in FIG. 1 until the FFT operation by FFT unit 143. Frequency-domain equalization (FDE) is performed by a FDE unit 145 after the FFT operation. An IFFT operation is then performed by IFFT unit 147 on the equalized symbols in order to obtain the data modulated symbols.

Figure 3:
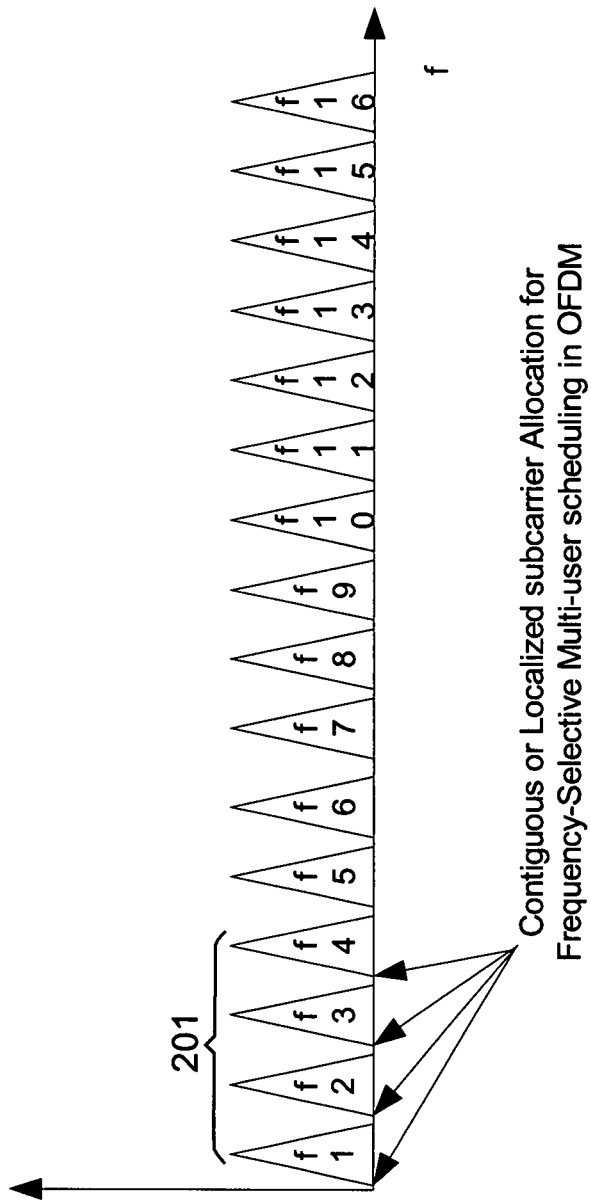
FIG. 3 illustrates a subcarrier allocation scheme for frequency-selective multi-user scheduling and frequency diversity in an OFDM system.

In a communication link, a multi-path communication channel results in a frequency-selective fading. Moreover, in a mobile wireless environment, the channel also results in a time-varying fading. Therefore, in a wireless mobile system employing OFDM/DFT-Spread-OFDM based access, the overall system performance and efficiency can be improved by using, in addition to time-domain scheduling, frequency-selective multi-user scheduling. In case of frequency-selective multi-user scheduling, a contiguous set of subcarriers potentially experiencing an upfade is allocated for transmission to a user. Upfade is a situation where multipath conditions cause a radio signal to gain strength. The total bandwidth is divided into multiple subbands, and each subband contains multiple contiguous subcarriers. As shown in FIG. 3, subcarriers $f_1$, $f_2$, $f_3$ and $f_4$ are grouped into a subband 201 for transmission to a user in frequency-selective multi-user scheduling mode. The frequency-selective multi-user scheduling is generally beneficial for low mobility users for which the channel quality can be tracked.

Figure 4:
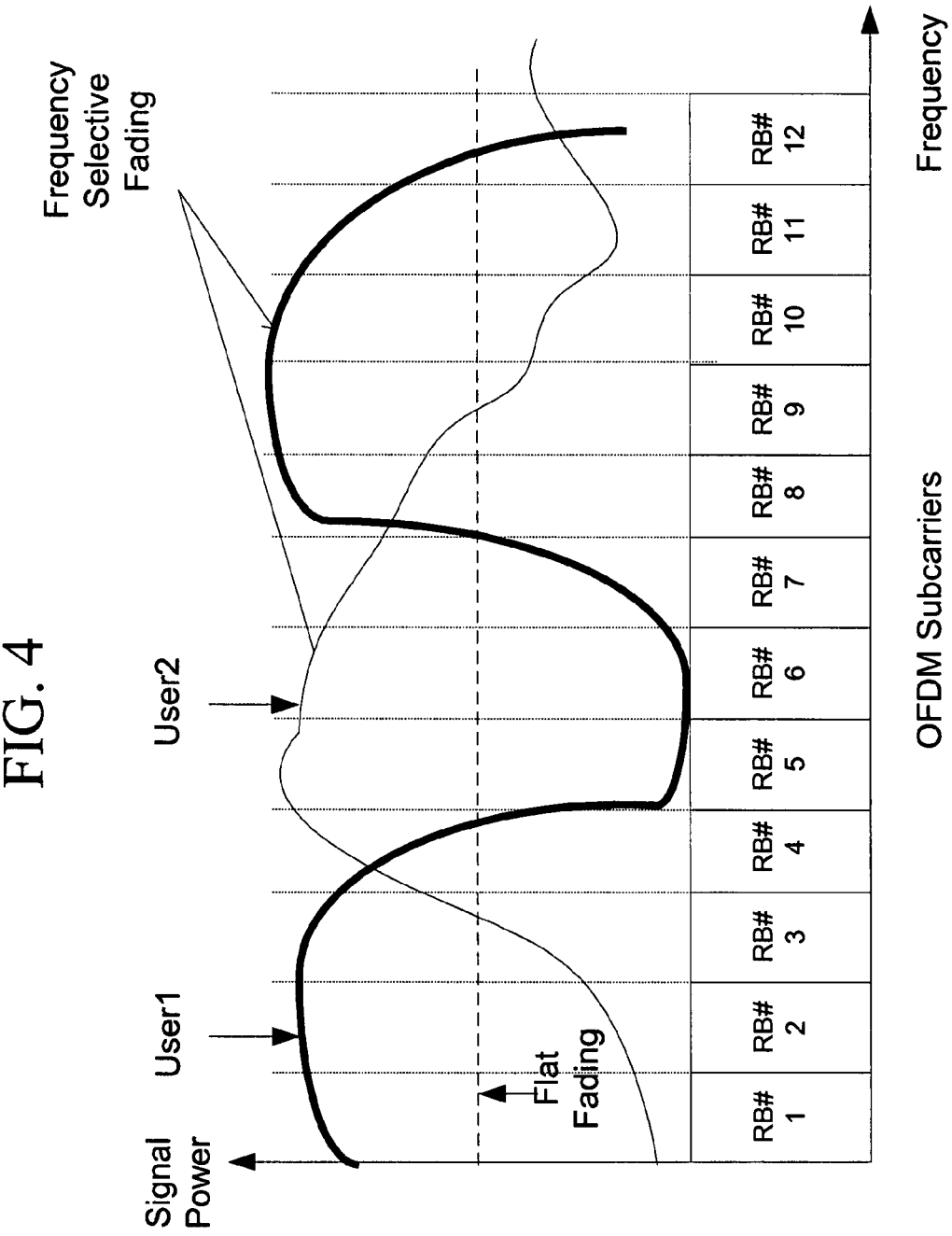
FIG. 4 illustrates an example of frequency-selective scheduling in an OFDM system.

An example of flat and frequency-selective scheduling in an OFDM system is shown in FIG. 4. As illustrated in FIG. 4, User 1's signal quality is better around the edge resource blocks RB#1, RB#2, RB#3, RB#8, RB#9, RB#10, RB#11 and RB#12, and User 2's signal quality is better around the middle resource blocks RB#4, RB#5, RB#6 and RB#7. If User 1 is scheduled at the edge resource blocks and User 2 is scheduled at the middle resource blocks, the signal quality can be improved. The channel quality indication (CQI) feedback per subband from a User Equipment (UE) is required in order to enable frequency-selective multi-user scheduling.

Figure 5:
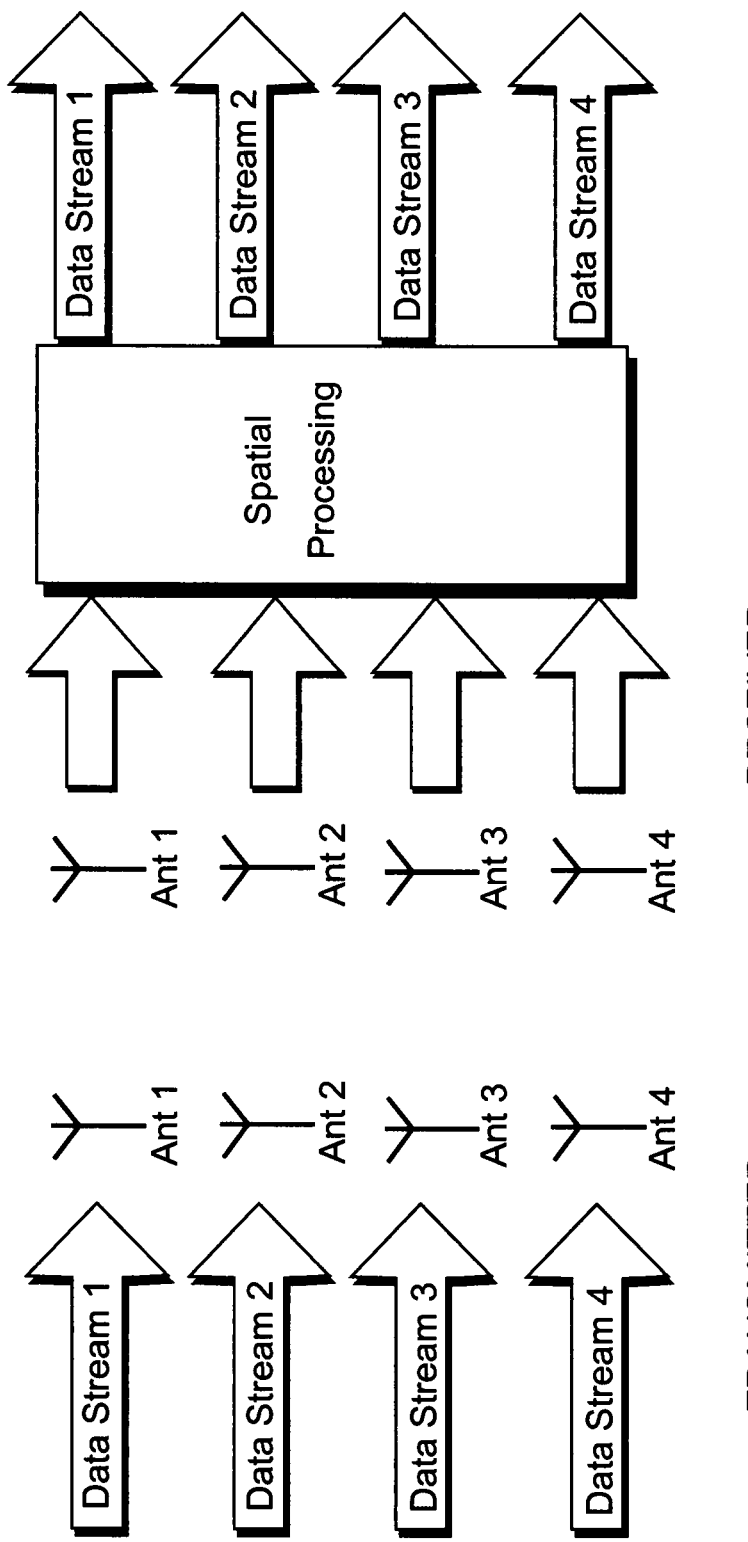
FIG. 5 is an illustration of a multiple input multiple output (MIMO) system suitable for the practice of the principles of the present invention.

Multiple Input Multiple Output (MIMO) schemes use multiple transmit antennas and multiple receive antennas to improve the capacity and reliability of a wireless communication channel. A MIMO system promises linear increase in capacity with K where K is the minimum of number of transmit (M) and receive antennas (N), i.e. K=min(M,N). A simplified example of a 4×4 MIMO system is shown in FIG. 5. In this example, four different data streams are transmitted separately from the four transmission antennas. The transmitted signals are received at the four reception antennas. Some form of spatial signal processing is performed on the received signals in order to recover the four data streams. An example of spatial signal processing is vertical Bell Laboratories Layered Space-Time (V-BLAST) which uses the successive interference cancellation principle to recover the transmitted data streams. Other variants of MIMO schemes include schemes that perform some kind of space-time coding across the transmit antennas (e.g., diagonal Bell Laboratories Layered Space-Time (D-BLAST)) and also beamforming schemes such as Spatial Division multiple Access (SDMA).

The MIMO channel estimation consists of estimating the channel gain and phase information for links from each of the transmit antennas to each of the receive antennas. Therefore, the channel for M×N MIMO system consists of an N×M matrix:

$$H = \begin{bmatrix} a_{11} & a_{12} & \cdots & a_{1M} \\ a_{21} & a_{22} & \cdots & a_{2M} \\ \vdots & \vdots & \cdots & \vdots \\ a_{N1} & a_{M2} & \cdots & a_{NM} \end{bmatrix} \quad (1)$$

where $a_{ij}$ represents the channel gain from transmit antenna j to receive antenna i. In order to enable the estimations of the elements of the MIMO channel matrix, separate pilots are transmitted from each of the transmit antennas.

Figure 6:
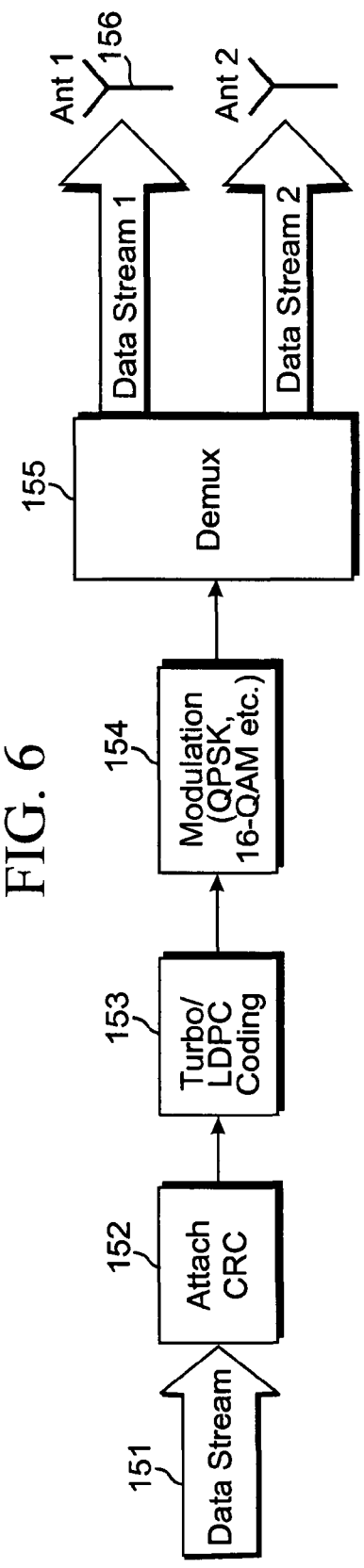
FIG. 6 is an illustration of a single-code word MIMO scheme suitable for the practice of the principles of the present invention.
Figure 7:
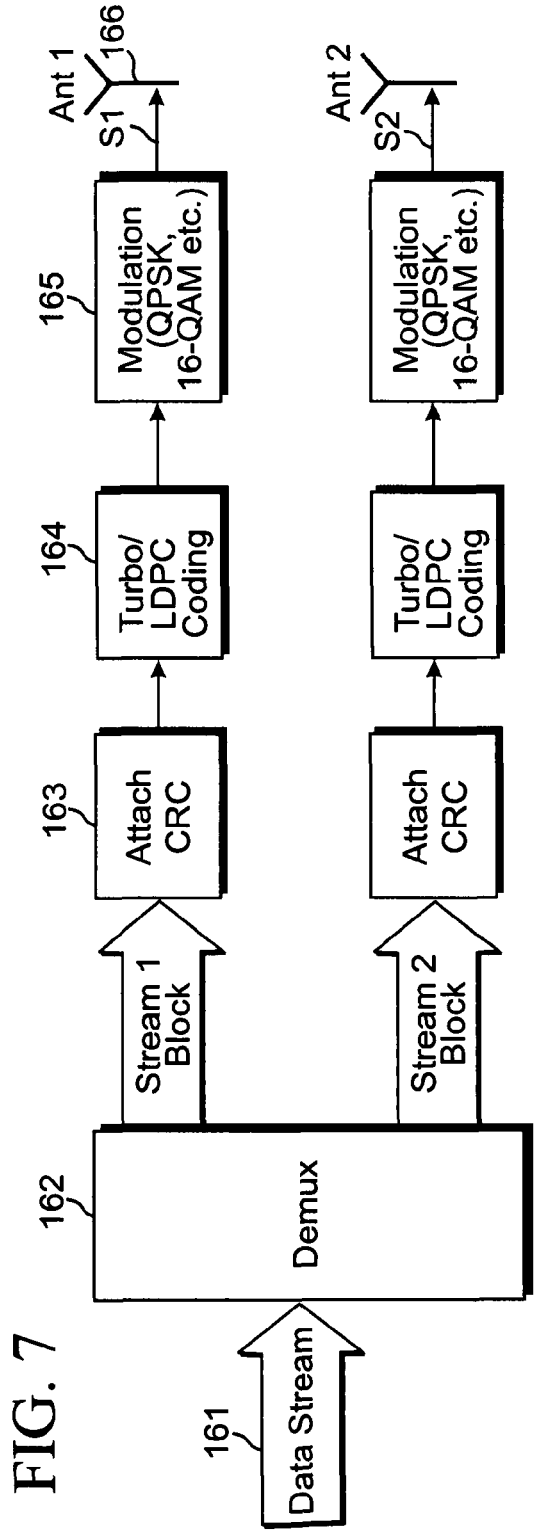
FIG. 7 is an illustration of a multi-code word MIMO scheme suitable for the practice of the principles of the present invention.

An example of a single-code word MIMO scheme is given in FIG. 6. In case of single-code word MIMO transmission, a cyclic redundancy check (CRC) 152 is added to a single data stream 151 and then coding 153 and modulation 154 are sequentially performed. The coded and modulated symbols are then demultiplexed 155 for transmission over multiple antennas 156.

In case of multiple-code word MIMO transmission, shown in FIG. 4, data stream 161 is demultiplexed 162 into smaller stream blocks. Individual CRCs 163 are attached to these smaller stream blocks and then separate coding 164 and modulation 165 is performed on these smaller blocks. These smaller blocks are then transmitted via separate MIMO antennas 166. It should be noted that in case of multi-code word MIMO transmissions, different modulation and coding can be used on each of the individual streams resulting in a so called PARC (per antenna rate control) scheme. Also, multi-code word transmission allows for more efficient post-decoding and interference cancellation because a CRC check can be performed on each of the code words before the code word is cancelled from the overall signal. In this way, only correctly received code words are cancelled to avoid any interference propagation in the cancellation process.

When the transmission channels between the transmitters and the receivers are relatively constant, it is possible to use a closed-loop MIMO scheme to further improve system performance. In a closed-loop MIMO system, the receiver informs the transmitter of the feedback information regarding the channel condition. The transmitter utilizes this feedback information, together with other considerations such as scheduling priority, data and resource availability, to optimize the transmission scheme.

A popular closed-loop MIMO scheme is MIMO precoding. With precoding, the data streams to be transmitted are precoded, i.e., pre-multiplied by a preceding matrix, before being passed on to the multiple transmit antennas in a transmitter.

An optional precoding protocol that employs a unitary pre-coding before mapping the data streams to physical antennas is shown in FIGS. 8A and 8B. The optional preceding creates a set of virtual antennas (VA) 171 before the pre-coding. In this case, each of the codewords is potentially transmitted through all the physical transmission antennas 172. Two examples of unitary precoding matrices, $P_1$ and $P_2$ for the case of two transmission antennas 172 may be:

$$P_1 = \frac{1}{\sqrt{2}} \begin{bmatrix} 1 & 1 \\ 1 & -1 \end{bmatrix}, \quad P_2 = \frac{1}{\sqrt{2}} \begin{bmatrix} 1 & 1 \\ j & -j \end{bmatrix} \quad (2)$$

Assuming modulated symbols $S_1$ and $S_2$ are transmitted at a given time through stream 1 and stream 2 respectively. Then the modulated symbol $T_1$ after precoding with matrix $P_1$ in the example as shown in FIG. 8A and the modulated symbol $T_2$ after precoding with matrix $P_2$ in the example as shown in FIG. 8B can be respectively written as:

$$T_1 = P_1 \begin{bmatrix} S_1 \\ S_2 \end{bmatrix} = \frac{1}{\sqrt{2}} \begin{bmatrix} 1 & 1 \\ 1 & -1 \end{bmatrix} \times \begin{bmatrix} S_1 \\ S_2 \end{bmatrix} = \frac{1}{\sqrt{2}} \begin{bmatrix} S_1 + S_2 \\ S_1 - S_2 \end{bmatrix} \quad (3)$$

$$T_2 = P_2 \begin{bmatrix} S_1 \\ S_2 \end{bmatrix} = \frac{1}{\sqrt{2}} \begin{bmatrix} 1 & 1 \\ j & -j \end{bmatrix} \times \begin{bmatrix} S_1 \\ S_2 \end{bmatrix} = \frac{1}{\sqrt{2}} \begin{bmatrix} S_1 + S_2 \\ jS_1 - jS_2 \end{bmatrix}$$

Therefore, the symbols $$T_{11} = \frac{(S_1 + S_2)}{\sqrt{2}} \text{ and } T_{12} = \frac{(S_1 - S_2)}{\sqrt{2}}$$

will be transmitted via antenna 1 and antenna 2, respectively, when precoding is done using preceding matrix $P_1$ as shown in FIG. 8A. Similarly, the symbols $$T_{21} = \frac{(S_1 + S_2)}{\sqrt{2}} \text{ and } T_{22} = \frac{(jS_1 - jS_2)}{\sqrt{2}}$$

will be transmitted via antenna 1 and antenna 2, respectively, when precoding is done using preceding matrix $P_2$ as shown in FIG. 8B. It should be noted that preceding is done on an OFDM subcarrier level before the IFFT operation as illustrated in FIGS. 8A and 8B.

An example of MIMO preceding is Fourier-based preceding. A Fourier matrix is a N×N square matrix with entries given by:

$$P_N = e^{j2\pi mn/N} \quad m,n = 0,1,\ldots (N-1) \tag{4}$$

A 2×2 Fourier matrix can be expressed as:

$$P_2 = \begin{bmatrix} 1 & 1 \\ 1 & e^{j\pi} \end{bmatrix} = \begin{bmatrix} 1 & 1 \\ 1 & -1 \end{bmatrix} \tag{5}$$

Similarly, a 4×4 Fourier matrix can be expressed as:

$$P_4 = \begin{bmatrix} 1 & 1 & 1 & 1 \\ 1 & e^{j\pi/2} & e^{j\pi} & e^{j3\pi/2} \\ 1 & e^{j\pi} & e^{j2\pi} & e^{j3\pi} \\ 1 & e^{j3\pi/2} & e^{j3\pi} & e^{j9\pi/2} \end{bmatrix} = \begin{bmatrix} 1 & 1 & 1 & 1 \\ 1 & j & -1 & -j \\ 1 & -1 & 1 & -1 \\ 1 & -j & -1 & j \end{bmatrix} \tag{6}$$

Multiple precoder matrices can be defined by introducing a shift parameter (gIG) in the Fourier matrix as given by:

$$P_{mn} = e^{\frac{j2\pi m}{N}\left(n+\frac{g}{G}\right)} \quad m,n = 0,1,\ldots (N-1) \tag{7}$$

A set of four 2×2 Fourier matrices can be defined by taking G=4. These four 2×2 matrices with g=0, 1, 2 and 3 are written as:

$$P_2^0 = \begin{bmatrix} 1 & 1 \\ 1 & -1 \end{bmatrix} \tag{8}$$

$$P_2^1 = \begin{bmatrix} 1 & 1 \\ e^{j\pi/4} & -e^{j\pi/4} \end{bmatrix} \tag{9}$$

$$P_2^2 = \begin{bmatrix} 1 & 1 \\ e^{j\pi/2} & -e^{j\pi/2} \end{bmatrix} \tag{10}$$

$$P_2^3 = \begin{bmatrix} 1 & 1 \\ e^{j3\pi/4} & -e^{j3\pi/4} \end{bmatrix} \tag{11}$$

In a transmission path from a base station to a user equipment (UE), i.e., downlink transmission, the precoding matrix is usually determined in dependence upon a preceding feedback information that is transmitted by the user equipment to the base station. The precoding feedback information typically includes precoding-matrix identity.

When the total bandwidth in an OFDM system is divided into a plurality of subbands, each subband being a set of consecutive subcarriers, due to frequency-selective fading in the OFDM system, the optimal precoding for different subbands (SBs), can be different, as shown in one example illustrated in FIG. 9. In FIG. 9, different SBs use different precoding matrix. Subband 1 (SB1) which includes continuous OFDM subcarriers 1 through 64, uses preceding matrix $P_2^2$; SB2 which includes continuous OFDM subcarriers 65 through 128, uses preceding matrix $P_2^1$, etc. Therefore, the preceding feedback information is transmitted on a subband basis. Moreover, due to feedback errors, the base station also needs to inform the user equipment of the preceding information used on transmitted subbands. This results in additional signaling overhead in the downlink.

Besides precoding information, another form of feedback information is rank information, i.e., the number of MIMO layers. A MIMO layer is a spatial channel that can carry data symbols. It is well known that even when a system can support 4×4 MIMO, rank-4 (4 MIMO layers) transmissions are not always desirable. The MIMO channel experienced by the UE generally limits the maximum rank that can be used for transmission. In general for weak users in the system, a lower rank transmission is preferred over a higher rank transmission from the throughput perspective. Moreover, due to frequency-selective fading, optimal rank may be different on different subbands. As shown in the example of FIG. 10, SB1 uses rank-1 transmission; SB2 uses rank-2 transmission, etc. Therefore, the UE needs to include the rank information in the feedback information on a subband basis. Also, due to a possibility of feedback errors, the base station additionally needs to indicate the transmitted MIMO rank on different subbands. The rank information can also be common across the subbands, that is, a single rank value is reported for all the subbands. In any case, this results in additional overhead on the downlink.

Figure 11:
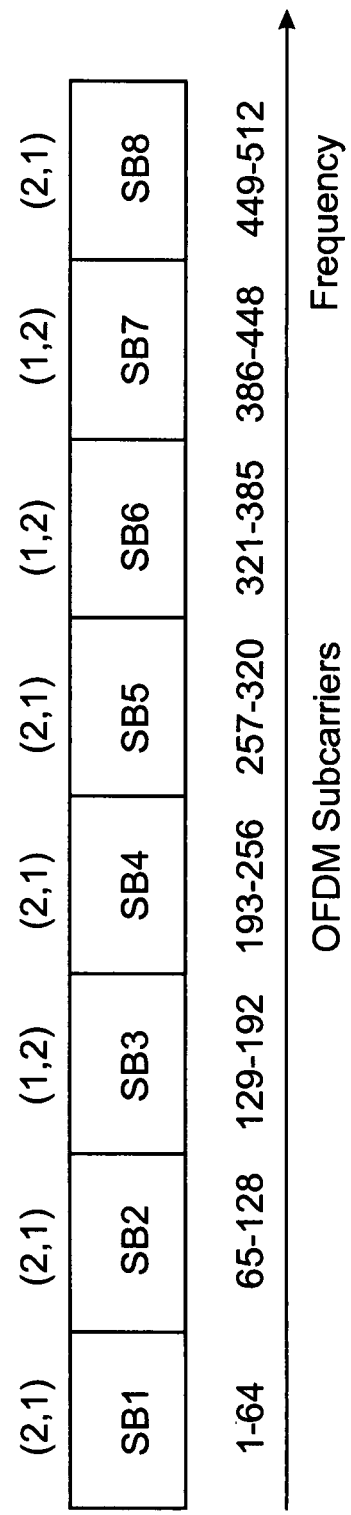
FIG. 11 is an illustration of an example of MIMO layer ordering on different subbands for a 2×2 MIMO system suitable for the practice of the principles of the present invention.

Still another form of MIMO feedback information is layer ordering information. In the example of FIG. 11, the layer order for SB1, SB2, SB4, SB5 and SB8 is layer 2, and then layer 1; while the layer order for SB3, SB6 and SB7 is layer 1, and then layer 2. The layer ordering information is generally transmitted by the UE and also indicated by the base station in control signaling on the downlink. The ordering of layers can be based on the channel quality they experience or other similar criteria.

Another form of MIMO feedback information which applies to both MIMO and non-MIMO scenarios is the selected subbands for transmission. In this case, the MIMO feedback information such as preceding, rank, IDs of selected layers and layer ordering is provided for the selected subbands only. In this case, however, both the UE and the base station need to signal the information on the selected subbands.

The Physical Uplink Control Channel (PUCCH) in the LTE system usually uses CAZAC Zadoff-Chu (ZC) sequence. A Zadoff-Chu (ZC) sequence of length N is defined as $$g_p(n) = \begin{cases} e^{-j\frac{2\pi1}{M2}pn^2} & \text{when } N \text{ is even} \\ e^{-j\frac{2\pi1}{M2}pn(n+1)} & \text{when } N \text{ is odd} \end{cases}, \quad n = 0, 1, \ldots, N-1 \quad (12)$$

where p, the sequence index, is relatively prime to N (i.e. the only common divisor for p and N is 1). For a fixed p, the Zadoff-Chu (ZC) sequence has ideal periodic auto-correlation property (i.e. the periodic auto-correlation is zero for all time shift other than zero). For different p, ZC sequences are not orthogonal, but exhibit low cross correlation. If the sequence length N is selected as a prime number, there are N−1 different sequences with periodic cross-correlation of $1/\sqrt{N}$ between any two sequences regardless of time shift.

In summary, with Zadoff-Chu sequence, N−1 different sequences with fixed periodic cross-correlation are available to be used as preambles, provided that N is a prime number. In addition, each of the sequence has ideal periodic auto-correlation property.

Figure 12:
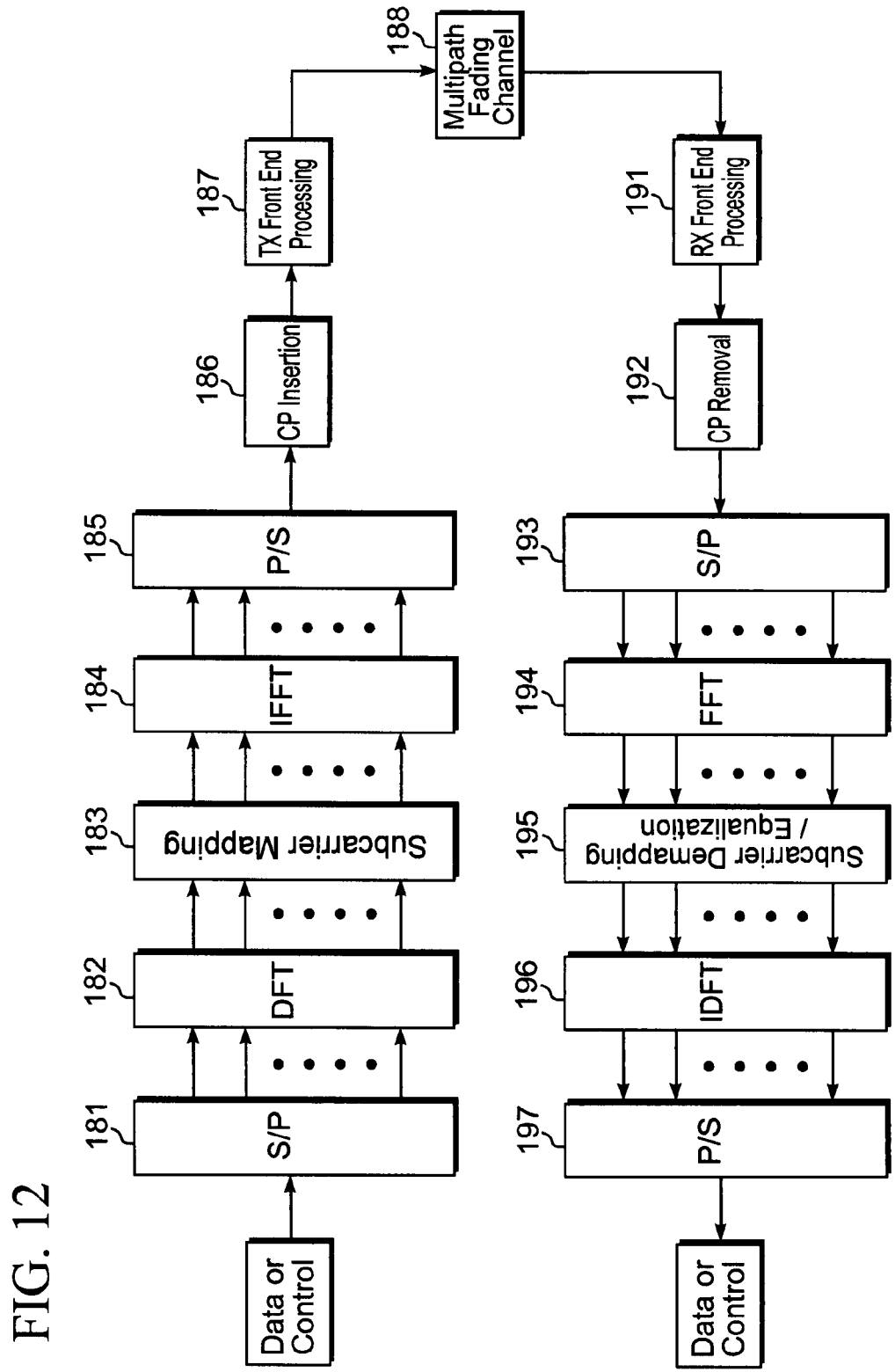
FIG. 12 is an illustration of single carrier frequency division multiple access (SC-FDMA) transceiver chain.

Single carrier frequency division multiple access (SC-FDMA), which utilizes single carrier modulation and frequency domain equalization is a technique that has similar performance and complexity as those of an OFDMA system. One advantage of SC-FDMA is that the SC-FDMA signal has a lower peak-to-average power ratio (PAPR) because of its inherent single carrier structure. Low PAPR normally results in high efficiency of power amplifier, which is particularly important for mobile stations in uplink transmission. SC-FDMA is selected as the uplink multiple acess scheme in 3GPP long term evolution (LTE). An example of the transceiver chain for SC-FDMA is shown in FIG. 12. At the transmitter side, the data or control signal is serial to parallel (S/P) converted by a S/P convertor 181. Discrete Fourier transform (DFT) will be applied to time-domain data or control signal by a DFT transformer 182 before the time-domain data is mapped to a set of sub-carriers by a sub-carrier mapping unit 183. To ensure low PAPR, normally the DFT output in the frequency domain will be mapped to a set of contiguous sub-carriers. Then IFFT, normally with larger size than the DFT, will be applied by an IFFT transformer 184 to transform the signal back to time domain. After parallel to serial (P/S) convertion by a P/S/ converter 185, cyclic prefix (CP) will be added by a CP insertion unit 186 to the data or the control signal before the data or the control signal is transmitted to a transmission front end processing unit 187. The processed signal with a cyclic prefix added is often referred to as a SC-FDMA block. After the signal passes through a communication channel 188, e.g., a multipath fading channel in a wireless communication system, the receiver will perform receiver front end processing by a receiver front end processing unit 191, remove the CP by a CP removal unit 192, apply FFT by a FFT transformer 194 and frequency domain equalization. Inverse Discrete Fourier transform (IDFT) 196 will be applied after the equalized signal is demapped 195 in frequency domain. The output of IDFT will be passed for further time-domain processing such as demodulation and decoding.

Figure 13:
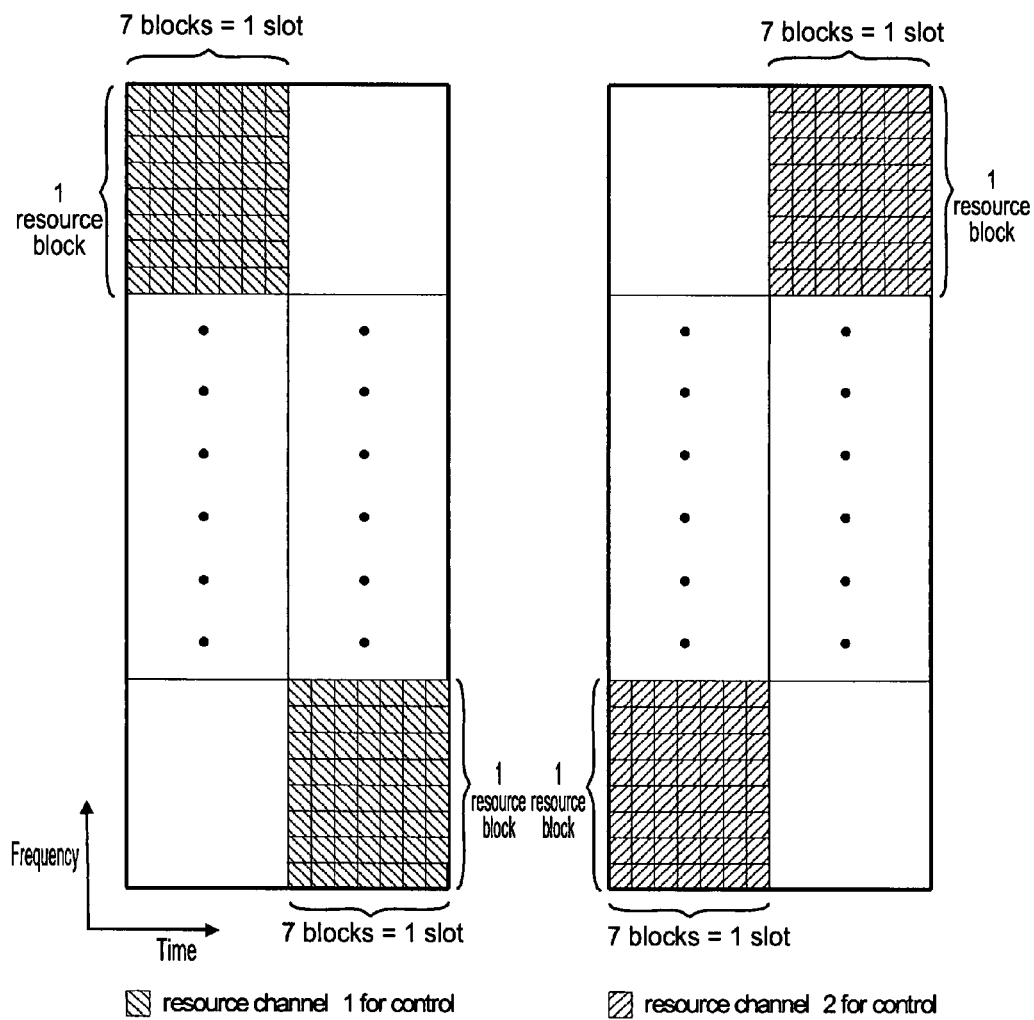
FIG. 13 is a resource allocation scheme for control channel in a SC-FDMA system.

An example of resource allocation for PUCCH in a LTE SC-FDMA system, is shown in FIG. 13. Resources at the edge of a band are allocated to control channel. Each resource channel for uplink control will hop from one edge of the band to the other edge of the band across the two slots within a subframe to capture frequency diversity while preserving the single-carrier transmission property, because the mobile station only transmit within a contiguous frequency band at any given time. Acknowledgement (ACK) channel is transmitted on one of these resource channels in the case there is no uplink data transmission. In the case when there is uplink data transmission, ACK and other uplink control channels can be multiplexed with the data transmission within the resource blocks assigned to that mobile station.

The different types of feedback information from the UE are summarized as below:
Subbands CQI Information
MIMO Rank
Antenna/Layer selection
MIMO Precoding
ACK/NACK for downlink data transmission In the contemporary transmission schemes, each type of feedback control information is separately coded/modulated and transmitted. This results in inefficient transmission because efficient coding across multiple control types cannot be employed. Moreover, if some type of CRC is used for error detection purpose, separate CRCs are required for each of the control information types resulting in excessive overhead.

Figure 14:
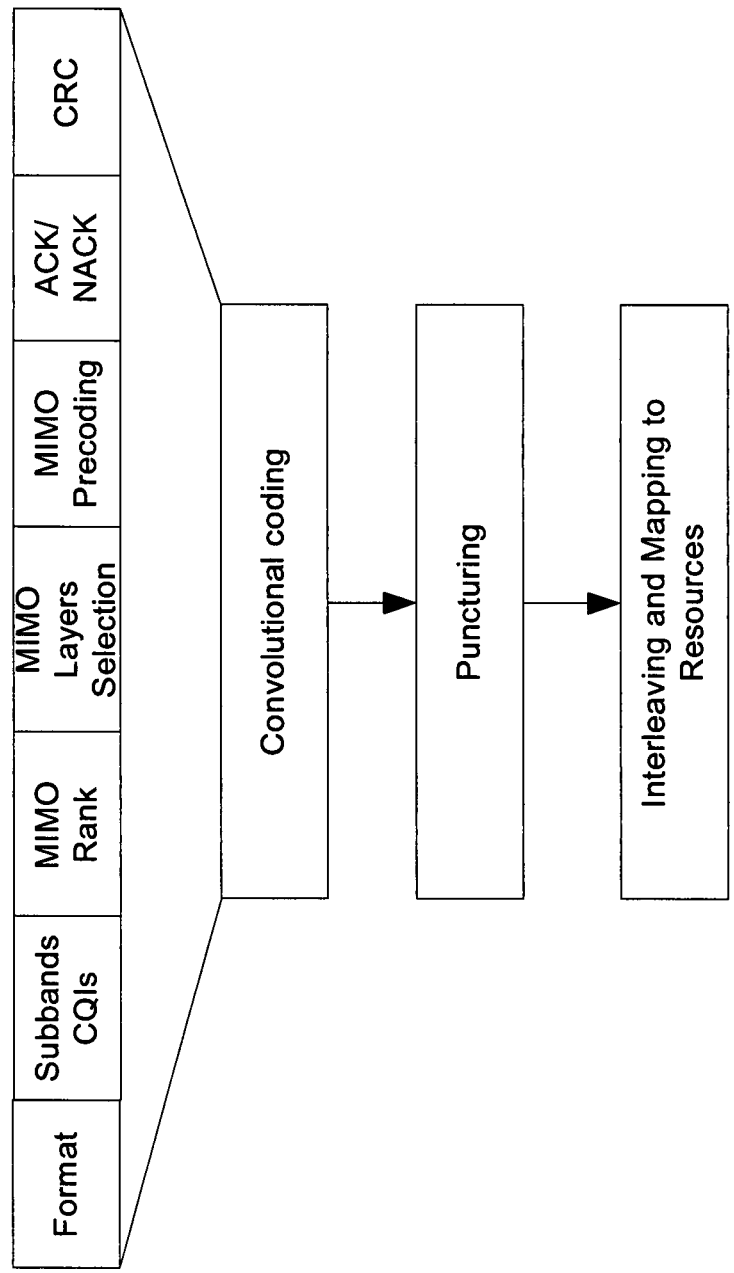
FIG. 14 illustrates a method for jointly encoding feedback information according to a first embodiment of the principles of the present invention.

In this invention, we describe a scheme to jointly code different types of feedback information from the UE as shown in FIG. 14. The Format field indicates the length of each field and whether a given field is present or not. For example, ACK/NACK feedback may only present if downlink transmission from the base station was received and an ACK or a NACK message needs to be transmitted at the time of transmission of the feedback control message. Similarly, in some cases one feedback information changes more than the other. In this case, it is appropriate to feedback the information that has experiences a larger delta change. For example, in some cases, CQI information can be updated while providing no information on MIMO preceding. At other instances, MIMO precoding information can be provided while not updating the CQI information. Note the message fields shown in FIG. 14 are for illustration purpose. This invention certainly covers schemes that jointly encodes a subset of fields shown in FIG. 14, and schemes that jointly encodes multiple message fields that may include fields not shown in FIG. 14.

Figure 15:
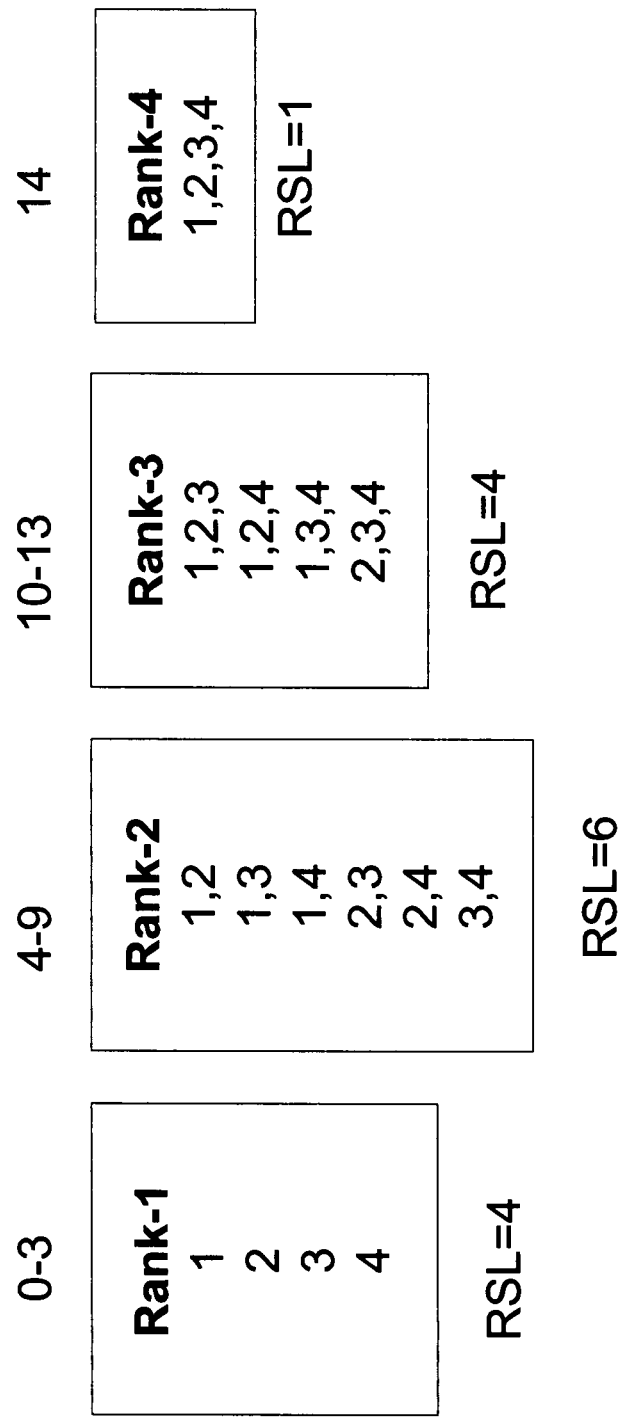
FIG. 15 illustrates an example of rank and selected layers indicator for four-transmission antennas case.

When different types of information is coded together, it is also possible to transmit the control information more efficiently. As shown in FIG. 15, rank and selected layers information is combined into a single field. A total of 4-bits feedback (4+6+4+1=15 combinations) is provided for MIMO rank and layer selection indication for the case of 4 transmission antennas (antennas 1, 2, 3 and 4) MIMO transmission. Specifically, four combinations (combinations 0 through 3) are provided for Rank-1 transmission; six combinations (combination 4 through 9) are provided for Rank-2 transmission; four combinations (combination 10 through 13) are provided for Rank-3 transmission; and one combination (combination 14) is provided for Rank-4 transmission. In case of two transmission antennas, MIMO rank and layer selection indication requires only 2-bits.

According to a first embodiment of the principles of the present invention, Table 1 lists eleven possible physical uplink control channel (PUCCH) formats. The PUCCH may contain seven fields: "Format", "Subbands CQI", "MIMO rank and selected layers", "MIMO preceding", "ACK/NACK", "Reserved" and "CRC". The PUCCH may have a total of five possible payload sizes, namely 60, 43, 36, 27 and 16 bits. We assume that the UE provides feedback when one (1), five (5) or ten (10) subbands over the total bandwidth are defined. The first possible control channel, i.e., control channel 1 carries subband CQI and subband based MIMO preceding information for the case of 10 subbands. The total payload size for control channel 1 is 60 bits. Control channel 2 carries subband CQI but no MIMO information for the case of 10 subbands. If we assume that MIMO rank information is common across the subbands, it is not necessary for the PUCCH to carry the information about the MIMO rank and the selected layers. Therefore, the number of bits in the field of "MIMO rank and selected layers" may be zero (0). The payload size for control channel 2 is 36 bits. Control channel 3 carries MIMO information for the case of 10 subbands but no CQI information. The payload size for control channel 3 is 36 bits. A UE may transmit control channel 2 and control channel 3 alternatively to provide the Node-B (i.e., the base station) information on both subband CQI and subband-based preceding. A 1-bit Format indication tells the Node-B which information is carried at a given time. This alternative transmission of control channel 2 and control channel 3 allows UE to transmit at a lower power compared to the case where UE uses control channel 1 for transmission of both subband CQI and subband preceding information. The Node-B does not need to blindly decode between control channel 2 and control channel 3 because of the presence of 1-bit format indication.

Control channel 4 is used when UE feedbacks subband CQI with common MIMO percoding information for the case of 10 subbands. Control channel 7 with the same payload size (i.e., 43 bits) is used when UE feedbacks subband CQI and also subband-based MIMO preceding MIMO information for the case of 5 subbands. A 1-bit format indicator differentiates between channel number 4 and 7.

Control channels 5, 6, 8 and 9 have the same 27 bits payload size and are differentiated by a 2-bit format indicator field. Control channel 5, for example, is used when UE feedbacks average CQI and common preceding which is effectively a single subband case.

The remaining 2 control channels namely control channel 10 and control channel 11 are used for average CQI feedback and no MIMO precoding. The difference between control channel number 10 and 11 is that 10 does not carry an ACK/NACK field. The channel number 11 carries a 2-bit ACK/NACK filed and a reduced granularity 3-bit CQI field. Both the control channel carries a total of 16 bits.

In other embodiments not described here, another PUCCH format carrying average CQI and subband preceding can be defined. It is also possible to add other fields in the PUCCH such as uplink resource requests, thus creating additional control formats. Also, when ACK/NACK is not expected, the 2-bits ACK/NACK field can be used for other purposes such as sending resource requests etc. Similarly, when two transmission antennas MIMO is used, MIMO rank and layer selection field only requires 2-bits and therefore the remaining 2-bits can be used for other types of uplink feedback or making more bits available to some of the fields such as CQI field.

TABLE I

Uplink PUCCH control channel formats

| | Control channel No. | Format | Subbands CQI | MIMO Rank and selected Layers | MIMO Precoding | ACK/ NACK | Reserved | CRC | Total bits |
|---|---|---|---|---|---|---|---|---|---|
| Subband CQI and Subband precoding [10 subbands] | 1 | 0 | 25 | 4 | 20 | 2 | 1 | 8 | 60 |
| Suband CQI and no MIMO information [10 subbands] | 2 | 1 | 25 | 0 | 0 | 2 | 0 | 8 | 36 |
| MIMO and ACK/NACK (No-CQI information) [10 subbands] | 3 | 1 | 0 | 4 | 20 | 2 | 1 | 8 | 36 |
| Suband CQI and Common precoding [10 subbands] | 4 | 1 | 25 | 4 | 3 | 2 | 0 | 8 | 43 |
| Average CQI and common precoding [1 subband] | 5 | 2 | 5 | 4 | 3 | 2 | 3 | 8 | 27 |
| Average CQI and no (fixed) precoding [1 subband] | 6 | 2 | 5 | 4 | 0 | 2 | 6 | 8 | 27 |
| Suband CQI and Subband precoding [5subbands] | 7 | 1 | 15 | 4 | 10 | 2 | 3 | 8 | 43 |
| Suband CQI and no MIMO information [5 subbands] | 8 | 2 | 15 | 0 | 0 | 2 | 0 | 8 | 27 |
| MIMO and ACK/NACK (No-CQI information) [5 subbands] | 9 | 2 | 0 | 4 | 10 | 2 | 1 | 8 | 27 |
| Average CQI, no (fixed) precoding, no ACK/NACK | 10 | 1 | 5 | 2 | 0 | 0 | 0 | 8 | 16 |
| Average CQI (3-bits reduced granularity), no precoding, 2-bits ACK/NACK | 11 | 1 | 3 | 2 | 0 | 2 | 0 | 8 | 16 |

Figure 16:
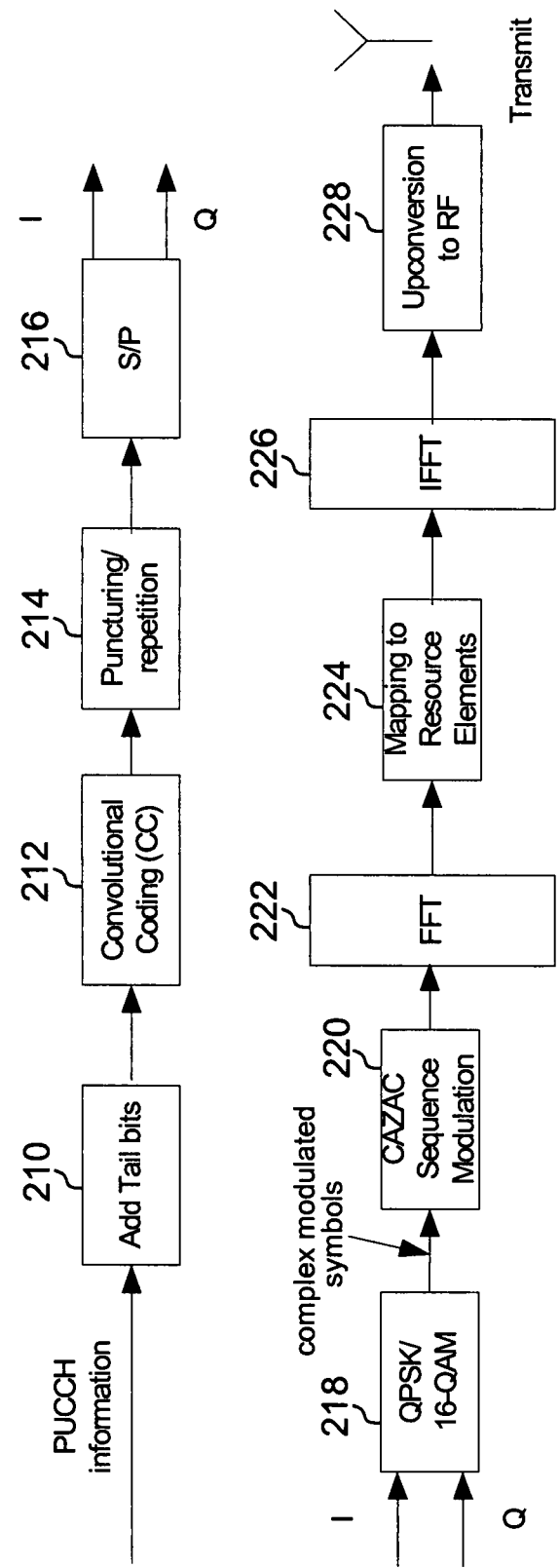
FIG. 16 illustrates a method for jointly encoding feedback information according to a second embodiment of the principles of the present invention.

In a second embodiment according to the principles of the present invention, as shown in FIG. 16, the PUCCH is first transferred into tail bit insertion unit 210. Tails bits are a fixed sequence of bits added to the end of a block of data to reset convolutional encoder 212 to a predefined state. Then, the PUCCH is coded with a convolutional code by convolutional encoder 212. The coded information is punctured as necessary by Puncturing/Repetition unit 214. After S/P conversion by S/P conversion unit 216, the information is modulated by modulator 218 using Quadrature Phase-Shift Keying (QPSK) modulation. A Constant Amplitude Zero Autocorrelation (CAZAC) sequence modulator 220 further modulates the complex modulated symbols using a CAZAC sequence. CAZAC sequence is used as an example and modulation with other sequences is also possible. An FFT operation is performed by FFT transformer 222 on the modulated CAZAC sequence and the resulting samples are mapped by mapping unit 224 to the PUCCH subcarrier resources at the input of IFFT 226. After addition of the cyclic prefix, the resulting signal is unconverted to RF by an upconversion unit 228 and transmitted via at least one antenna. It should be noted that other modulation formats other than QPSK such as Binary Phase Shift Keying (BPSK) and 16-Quadrature Amplitude Modulation (QAM) can be used. Moreover, coding schemes other than convolutional coding, such as tail-biting convolutional codes or various types of block codes can be used. Also, one or more steps in the process can be skipped. For example, in some embodiments, the modulated symbols can be directly FFT precoded and mapped to physical resource without the need for CAZAC sequence modulation. In another embodiment, the FFT precoding operation can be skipped, for example.

Figure 17:
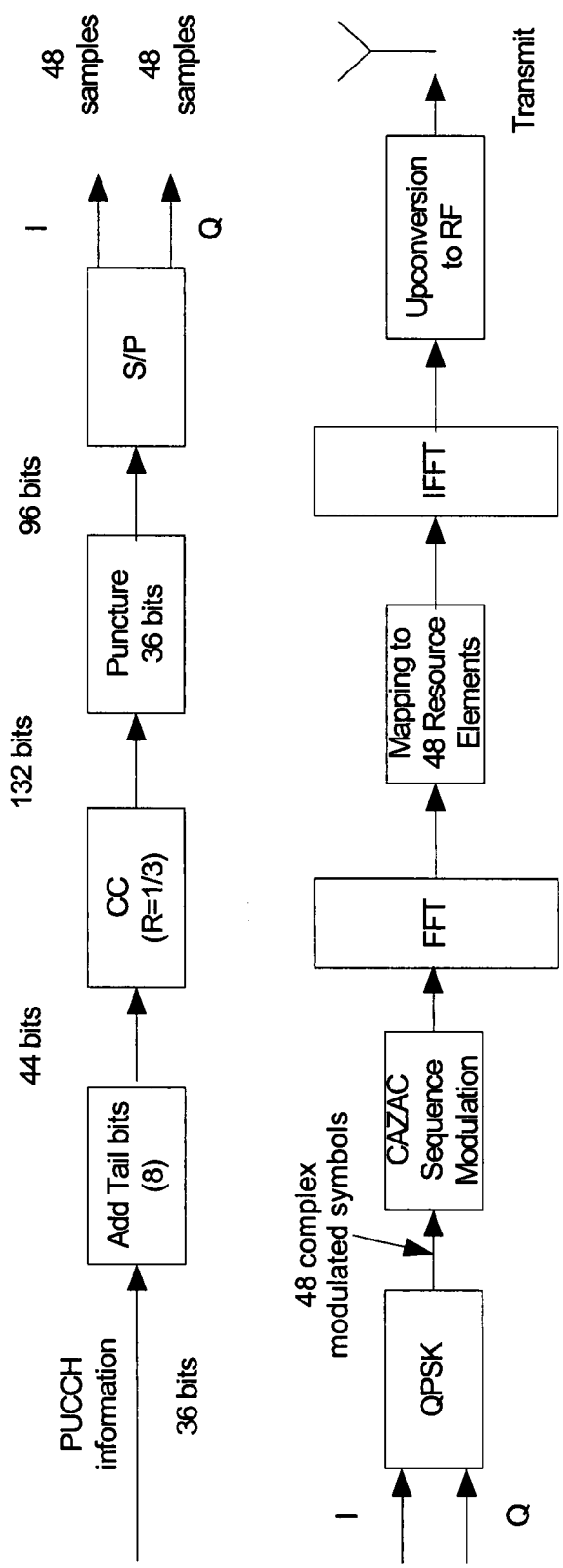
FIG. 17 illustrates a detailed example for jointly encoding feedback information according to the second embodiment of the principles of the present invention.

In an example embodiment according to the principles of the present invention shown in FIG. 17, 8 tail bits are added to 36-bits of PUCCH information and the information is convolutional coded with a ⅓ coding rate. This results in a total of 132 coded bits. In the next step, 36 bits are punctured providing 96 coded bits. These 96 bits are QPSK modulated resulting in 48 complex modulated symbols. Each complex modulated symbol further modulates a CAZAC sequence and the resulting 48 sequences are mapped to 48 physical resource elements.

Figure 18:
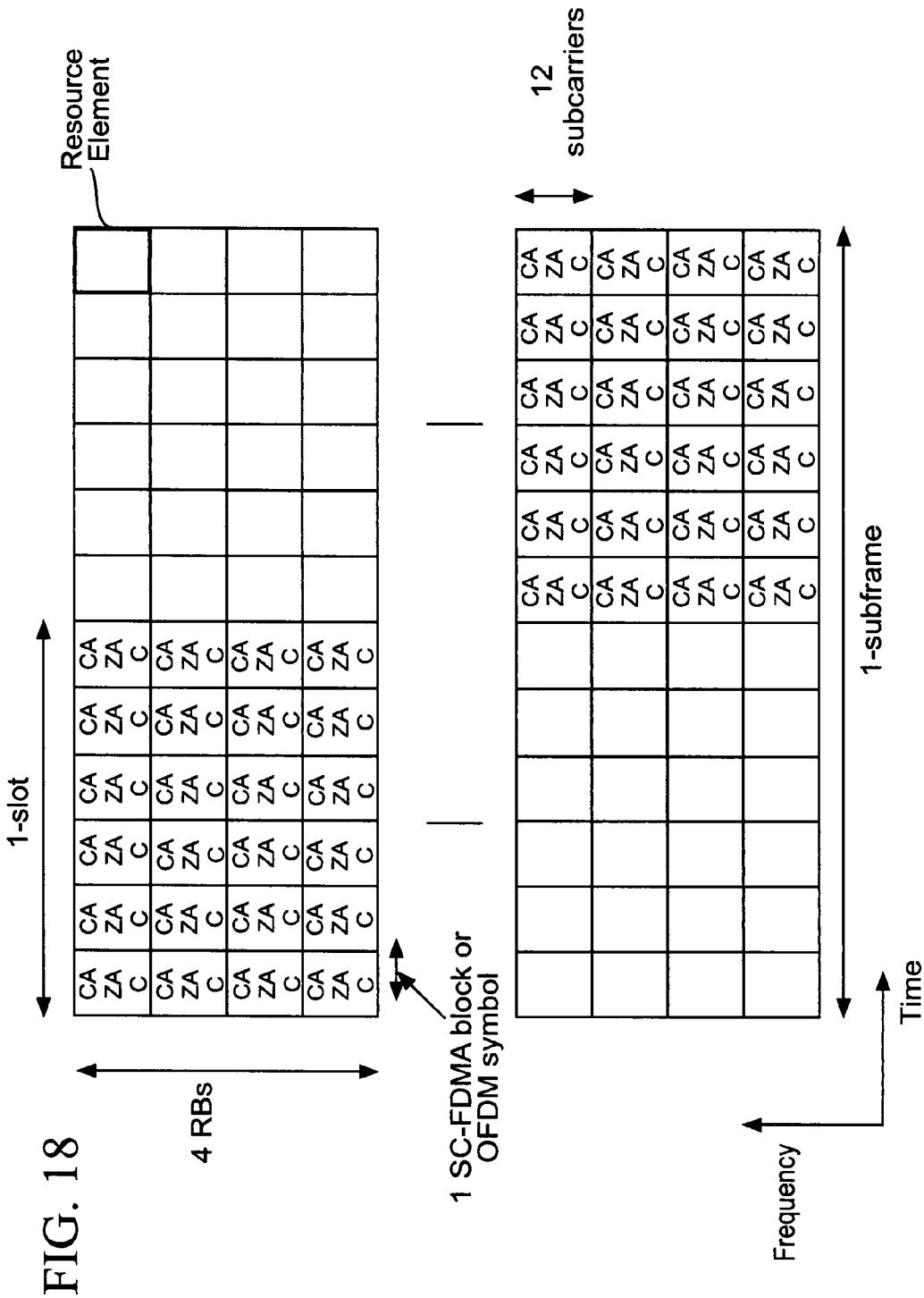
FIG. 18 illustrates a method for mapping control channel information into transmission resources according to a third embodiment of the principles of the present invention.
Figure 19:
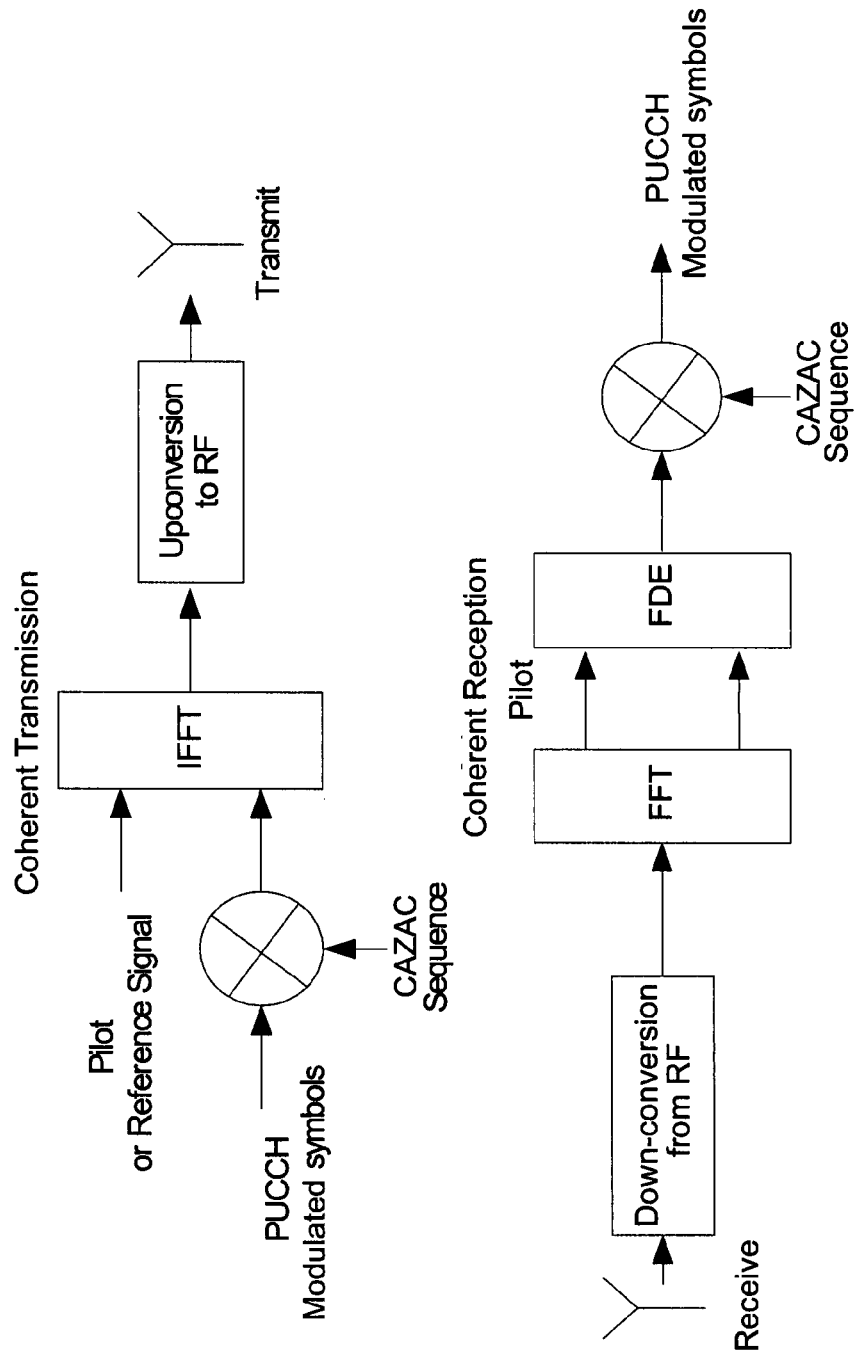
FIG. 19 illustrates a method for coherent transmission and a method of coherent reception.

According to a third embodiment of the principles of the present invention, an example of PUCCH physical resource mapping is shown in FIG. 18. In the third embodiment of the present invention, a coherent modulation using QPSK is assumed. As shown in FIG. 19, in the case of coherent transmission, the CAZAC sequence is modulated with the modulated symbols and pilot or reference signals are transmitted to aid channel estimation at the receiver. In the case of coherent reception, the channel estimation is performed based on the received pilot or reference signals. The channel estimates are then used to perform frequency-domain equalization (FDE) of the received PUCCH data symbols. The equalized modulated samples at the output of FDE are demodulated by the used CAZAC sequence to obtain the transmitted PUCCH data modulated symbols. In coherent modulation using QPSK, two bits can be carried by a single sequence. Regarding the mapping of the PUCCH, a resource element (RE) is defined as one RB over a single SC-FDMA block or OFDM symbol. In the example of FIG. 18, the is PUCCH is mapped to forty-eight (48) REs, that is, the PUCCH is transmitted over four (4) RBs in twelve (12) SC-FDMA blocks. Each QPSK symbol modulates a length twelve (12) CAZAC sequence and each modulated CAZAC sequence is mapped to one RE (12 subcarriers).

Figure 20:
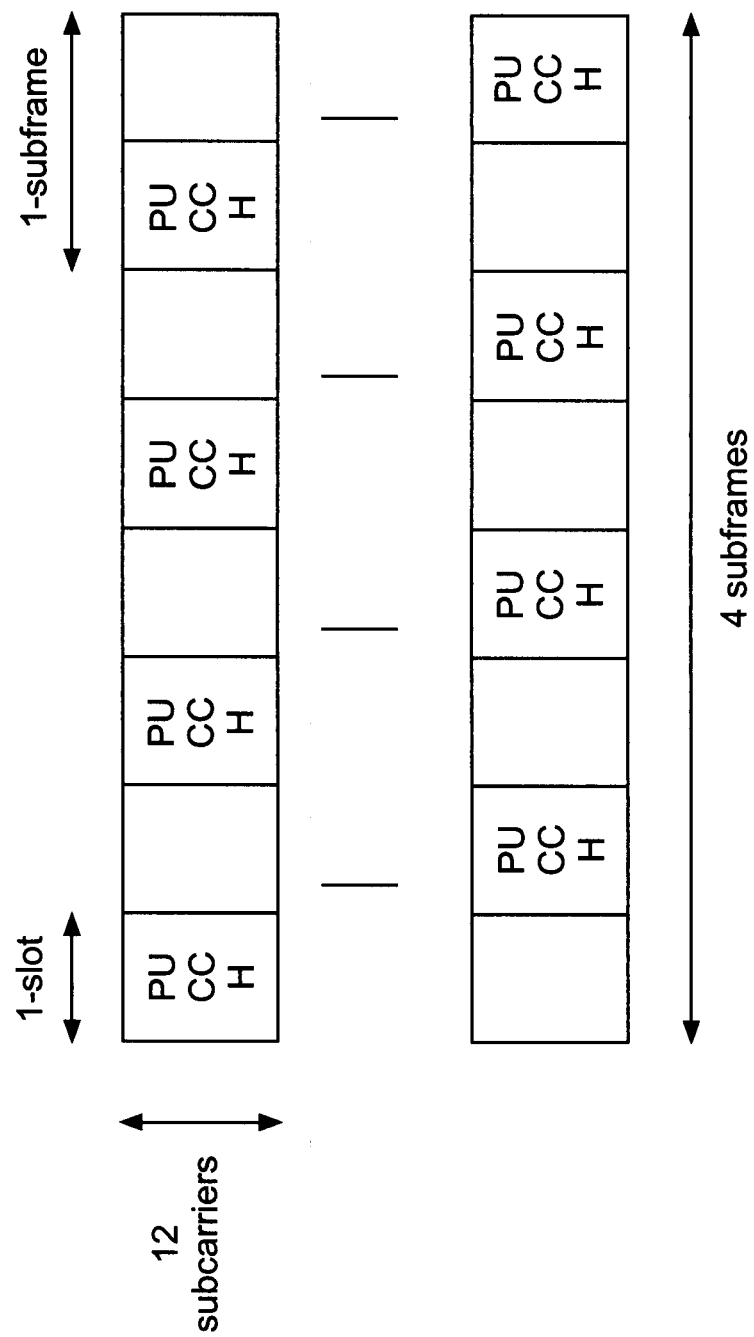
FIG. 20 illustrates a method for mapping control channel information into transmission resources according to a fourth embodiment of the principles of the present invention.

In a fourth embodiment according to the principles of the present invention shown in FIG. 20, the PUCCH is mapped to four subframes with one RB used in each subframe. Each CAZAC sequence is of a length of 12 and is mapped to 12 subcarriers. There are 12 SC-FDMA blocks within a subframe. Therefore, 12 CAZAC sequences are carried within a subframe. Each subframe carries twelve modulated CAZAC sequences with four subframes carrying forty-eight modulated CAZAC sequences. This allows for exploiting some time-diversity in the transmission of PUCCH. Also, for smaller bandwidths the total number of RBs is small and therefore spreading the PUCCH in time allows using smaller number of RBs per subframe.

Figure 21:
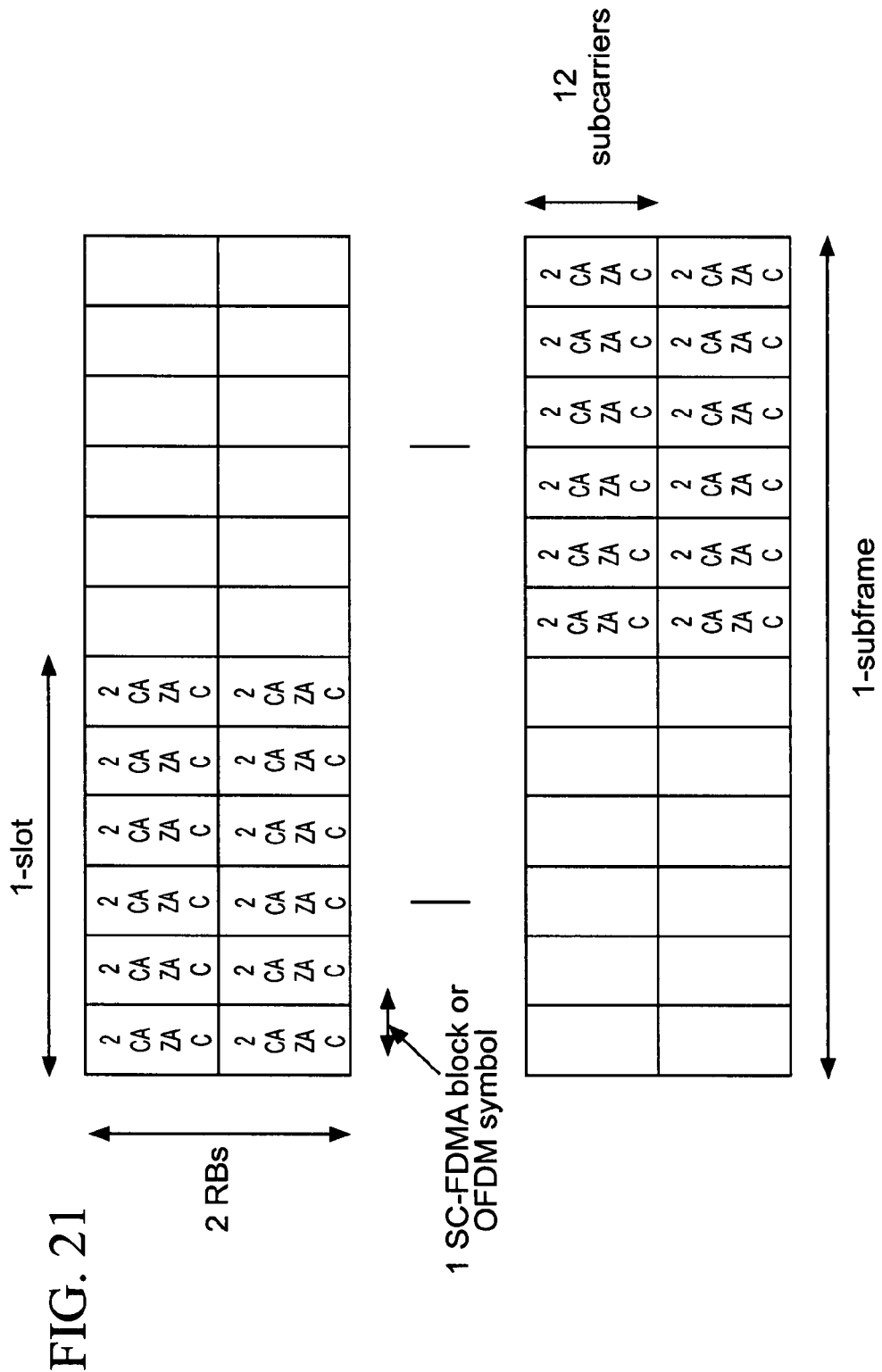
FIG. 21 illustrates a method for mapping control channel information into transmission resources according to a fifth embodiment of the principles of the present invention.

In a fifth embodiment according to the principles of the present invention, different length CAZAC sequences can be used. For example, FIG. 21 shows the case where length 6 CAZAC sequences are used. In this case, total of 48 modulated CAZAC sequences are transmitted over 2 resource blocks (RBs), that is over 24 resource elements. In this case each resource element containing 12 subcarriers contain 2 CAZAC sequences of length 6 each.

Figure 22:
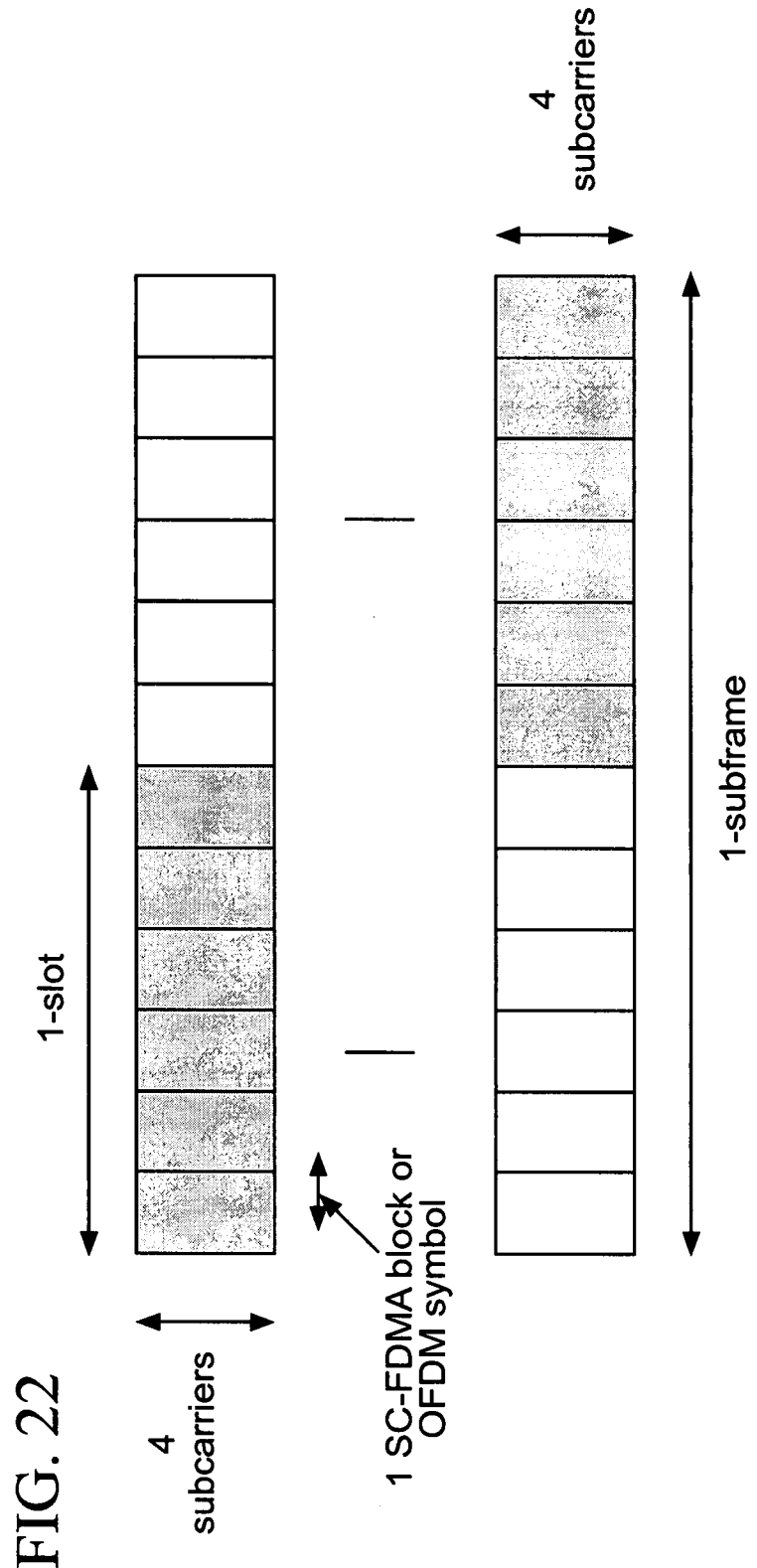
FIG. 22 illustrates a method for mapping control channel information into transmission resources according to a sixth embodiment of the principles of the present invention.

In a sixth embodiment according to the principles of the present invention shown in FIG. 22, the PUCCH is mapped to 4 subcarriers in 12 SC-FDMA blocks without CAZAC sequence modulation. The 4 subcarriers in 12 SC-FDMA blocks provide 48 subcarriers that are used to carry 48 QPSK modulated symbols from PUCCH.

Figure 23:
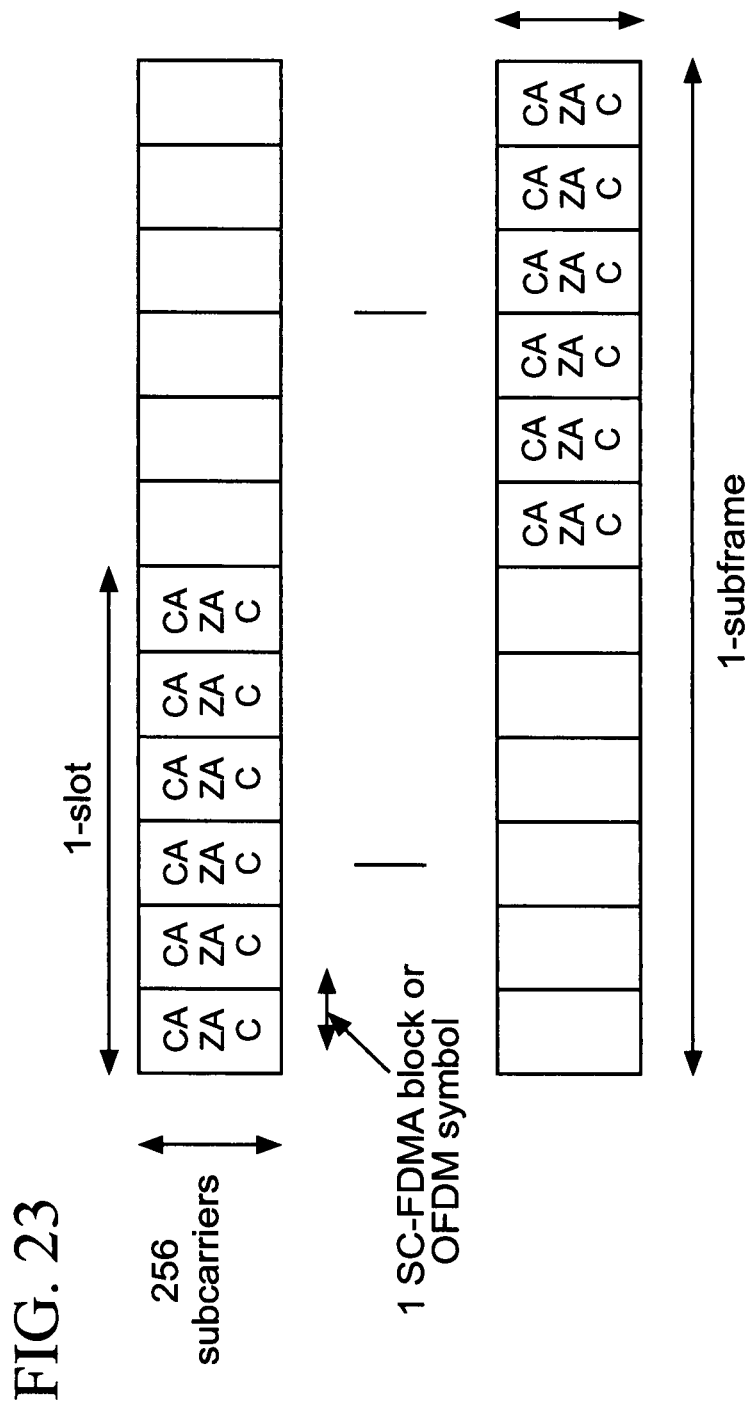
FIG. 23 illustrates a method for mapping control channel information into transmission resources according to a seventh embodiment of the principles of the present invention.
Figure 24:
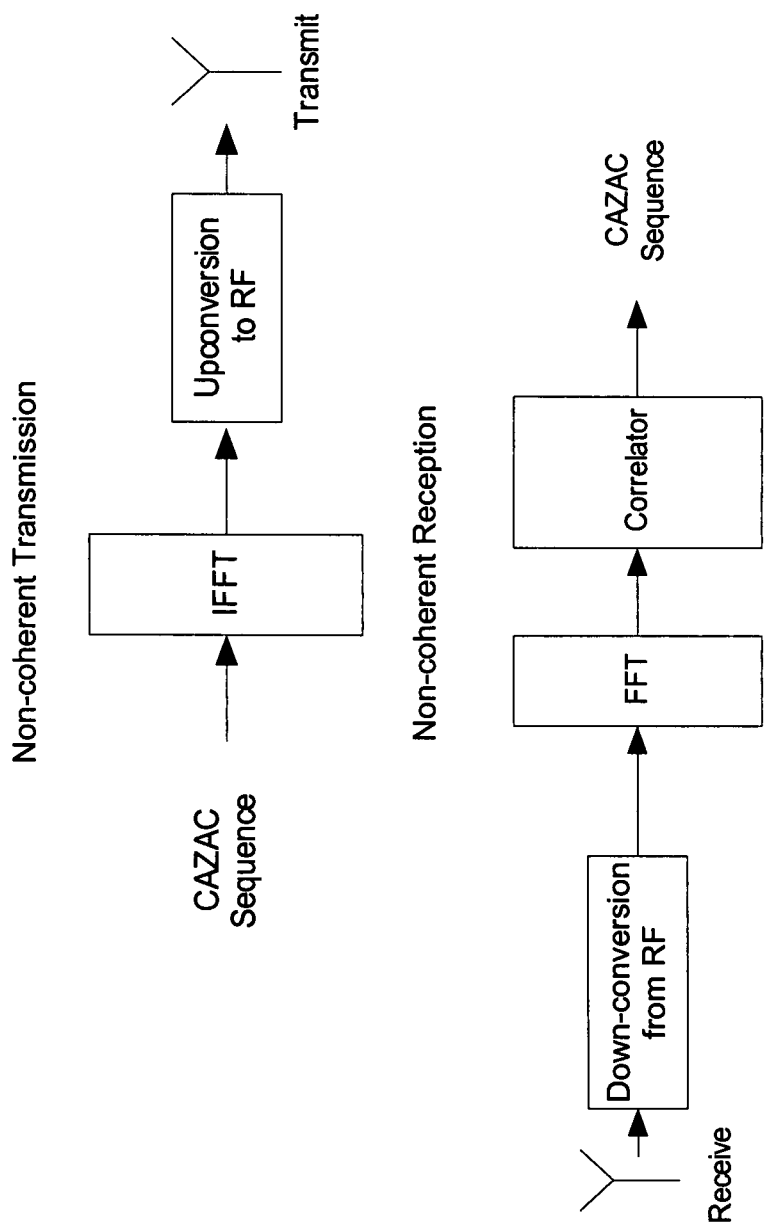
FIG. 24 illustrates a method for non-coherent transmission and a method of non-coherent reception.

In a seventh embodiment according to the principles of the present invention shown in FIG. 23, multiple length 256 CAZAC sequences, i.e., 256 possible CAZAC sequences are transmitted over two hundred and fifty-six (256) subcarriers in twelve SC-FDMA blocks. Each of the 256 possible CAZAC sequences has 256 elements. Unlike the previous embodiments, the seventh embodiment uses a non-coherent transmission. As shown in FIG. 24, in the case of non-coherent transmission, the CAZAC sequence is mapped to the subcarriers at the input of IFFT. When FFT-precoding is used, the CAZAC sequence is mapped at the input of FFT and the samples at the output of FFT are mapped to subcarriers at the input of IFFT. In case of non-coherent reception, the receiver performs a correlation operation on the received frequency domain samples with all the possible CAZAC sequences expected. Then a decision is made on the received CAZAC sequence based on a threshold criterion. Since a single sequence from among multiple possible sequences is received, the received sequence indicates the information bits of PUCCH. Each of the 256 possible CAZAC sequences can be represented by 8-bits information because $2^8=256$. Among the 256 CAZAC sequences, a single sequence is selected to be transmitted in each of the twelve SC-FDMA blocks. This allows carrying 8-bits in each SC-FDMA block with a total of 96 coded bits in these twelve SC-FDMA blocks (12×8=96). It should be noted that in this case a non-coherent detection can be performed on the transmitted sequences without requiring pilot or reference signals transmitted with PUCCH.

Figure 25:
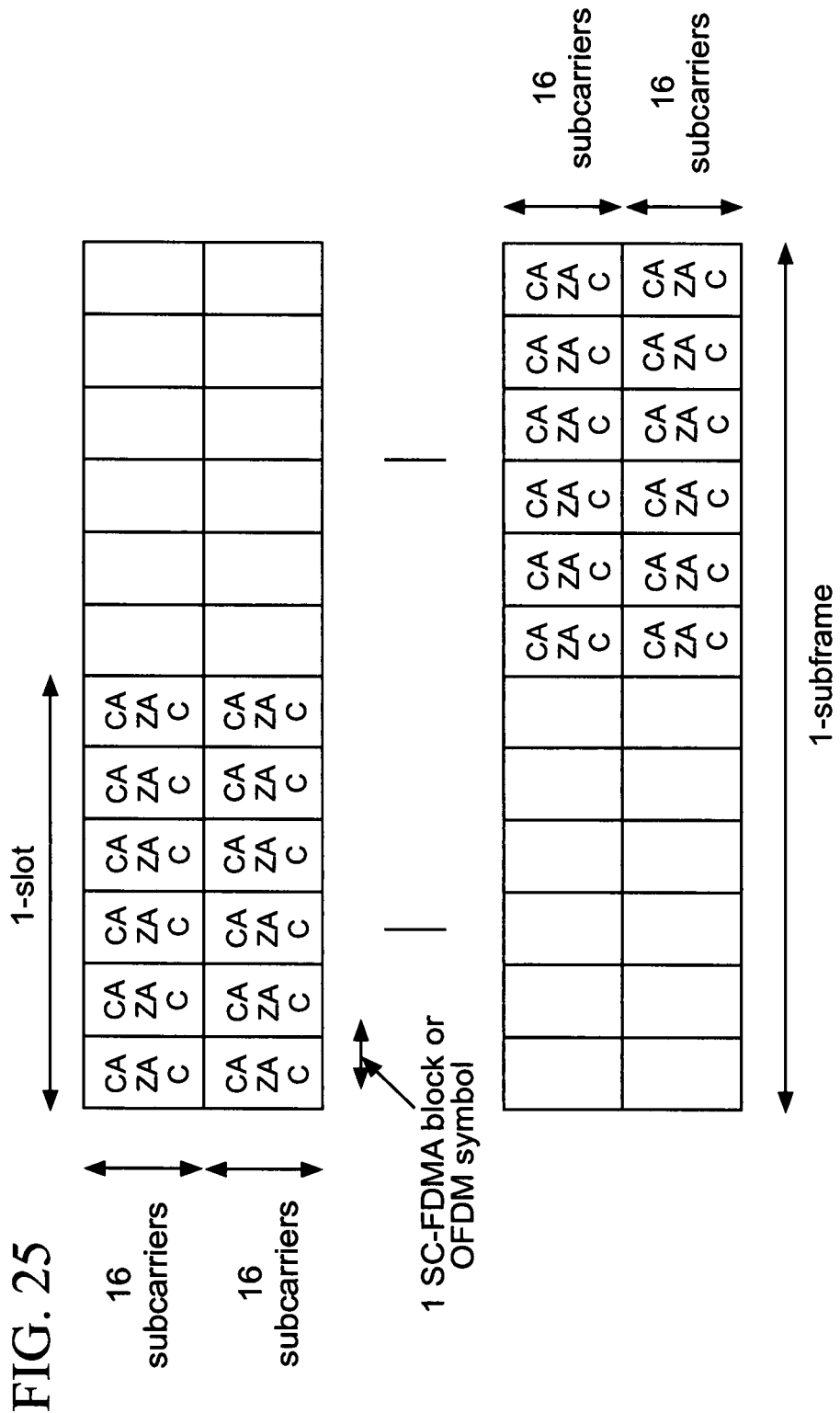
FIG. 25 illustrates a method for mapping control channel information into transmission resources according to an eighth embodiment of the principles of the present invention.

In a seventh embodiment according to the principles of the present invention shown in FIG. 25, two length-16 CAZAC sequences, i.e., sixteen possible CAZAC sequences, are transmitted over thirty-two subcarriers in each of the twelve (12) SC-FDMA blocks. Among the sixteen CAZAC sequences, a single sequence is transmitted using 16 subcarriers in each SC-FDMA block. This allows carrying 4 bits in each 16 sub-carriers in each SC-FDMA block. Therefore, a total of 96 coded bits can be carried in 32-subcarriers in the 12 SC-FDMA blocks (12×2×4=96). It should be noted that in this case a non-coherent detection can be performed on the transmitted sequences without requiring pilot or reference signals transmitted with PUCCH.

Base station, also referred to as eNode-B in the LTE system, can configure what PUCCH channel a UE can use. In case eNode-B allows a UE to use all the possible PUCCH formats listed in Table-I, a total of five blind decodings for the 5 payload sizes are necessary at the eNode-B. A total of eleven different PUCCH actual formats are supported, however, and some of the formats are differentiated using the 1 or 2-bit Format field and hence do not require additional blind decodings.

It should be noted that when ACK/NACK is transmitted jointly coded with other information, upon CRC failure, eNode-B should interpret any ACK/NACK transmitted at that time as a NACK signal.

In cases where additional SC-FDMA blocks are used for other purposes such as sounding reference signal (RS), additional puncturing of coded symbols may be performed or a larger number of RBs or subcarriers can be allocated to PUCCH.

What is claimed is:

1. A method for transmitting control information, the method comprising:
   receiving a reference signal from a first transceiver;
   in response to the reception of the reference signal, determining a plurality of control information based upon the received reference signal;
   jointly encoding the plurality of control information using a block code;
   modulating the encoded control information to generate a plurality of modulated symbols using a selected modulation scheme;
   multiplying a selected sequence with the modulated symbols to generate a plurality of multiplied sequences;
   identifying available transmission resources comprised of a plurality of equal duration resource elements in time and frequency domain, with each resource element corresponding to a respective one of a plurality of subcarriers, and a number of the subcarriers being equal to a number of elements within each of the plurality of multiplied sequences;
   mapping the plurality of multiplied sequences into two sets of resource elements in time and frequency domains in a subframe, with a number of resource elements in the two sets being equal to a number of elements of the plurality of multiplied sequences, a first set of the two sets of resource elements being located in one edge of the subframe in the frequency domain and in a first half of the subframe in the time domain, and a second set of the two sets of resource elements being located in an opposite edge of the subframe in the frequency domain and in a second half of the subframe in the time domain; and
   converting the mapped sequences to radio frequency signals for transmission.

2. The method of claim 1, further comprising:
   mapping the plurality of multiplied sequences into the two sets of resource elements with one element of each multiplied sequence corresponding to one resource element.

3. The method of claim 1, wherein, when identifying the available transmission resources, each resource element is formed with Y subcarriers, each of the plurality of multiplied sequences includes Z elements, and Y/Z=B, where B is a positive integer, and
   when mapping the plurality of multiplied sequences into the two sets of resource elements, each resource element corresponds to B multiplied sequences.

4. The method of claim 1, further comprising selecting a subset of multiplied sequences to be mapped into the first set of the two sets of resource elements, with the number of elements of the multiplied sequences within the subset of multiplied sequences being equal to the number of resource elements in the first set of resource elements,
   wherein mapping the plurality of multiplied sequences into the two sets of resource elements comprises mapping the multiplied sequences within the subset of multiplied sequences into the two sets of resource elements with each element of a multiplied sequence corresponding to one resource element.

5. The method of claim 4, wherein each multiplied sequence is formed with N bits, and wherein a relationship between the total number of multiplied sequences and a number of bits in each multiplied sequence is established by:

$$M=2^N,$$

where M is the total number of multiplied sequences.

6. An apparatus configured to communicate control information, the apparatus comprising:
   a receiver configured to receive a reference signal from a transceiver; and
   a controller configured to:
   in response to reception of the reference signal, determine a plurality of control information based upon the received reference signal; and
   jointly encode the plurality of control information using a block code;
   modulate the encoded control information to generate a plurality of modulated symbols using a selected modulation scheme;
   multiply a selected sequence with the modulated symbols to generate a plurality of multiplied sequences;
   identify available transmission resources comprised of a plurality of equal duration resource elements in time and frequency domains, with each resource element corresponding to a respective one of a plurality of subcarriers, and
   a number of the subcarriers being equal to a number of elements within each of the plurality of multiplied sequences;
   map the plurality of multiplied sequences into two sets of resource elements in time and frequency domains in a subframe, with a number of resource elements in the two sets being equal to a number of elements of the plurality of multiplied sequences, a first set of the two sets of resource elements being located in one edge of the subframe in the frequency domain and in a first half of the subframe in the time domain, and a second set of the two sets of resource elements being located in the opposite edge of the subframe in the frequency domain and in a second half of the subframe in the time domain; and
   convert the mapped sequences to radio frequency signals for transmission.

7. The apparatus of claim 6, wherein the controller is configured to:
   map the plurality of multiplied sequences into the two sets of resource elements with one element of each multiplied sequence corresponding to one resource element.

8. The apparatus of claim 6, wherein, when identifying the available transmission resources, each resource element is formed with Y subcarriers, each of the plurality of multiplied sequences includes Z elements, and Y/Z=B, where B is a positive integer, and when mapping the plurality of multiplied sequences into the two sets of resource elements, each resource element corresponds to B multiplied sequences.

9. The apparatus of claim 6, wherein the controller is further configured to:

select a subset of multiplied sequences to be mapped into the first set of the two sets of resource elements, with the number of elements of the multiplied sequences within the subset of multiplied sequences being equal to the number of resource elements in the first set of resource elements, wherein mapping the plurality of multiplied sequences into the two sets of resource elements comprises mapping the multiplied sequences within the subset of multiplied sequences into the two sets of resource elements with each element of a multiplied sequence corresponding to one resource element.

10. The apparatus of claim 9, wherein each multiplied sequence is formed with N bits, and wherein a relationship between the total number of multiplied sequences and a number of bits in each multiplied sequence is established by:

$$M=2^N,$$

where M is the total number of multiplied sequences.

11. An apparatus configured to receive control information, the apparatus comprising:

a transmitter configured to transmit a reference signal to a transceiver; and a receiver configured to receive a control signal from the transceiver, wherein the control signal is transmitted by the transceiver, and wherein the control signal is generated by a controller coupled to the transceiver and configured to:

in response to the reception of the reference signal, determine a plurality of control information based upon the received reference signal;

jointly encode the plurality of control information using a block code;

modulate the encoded control information to generate a plurality of modulated symbols using a selected modulation scheme;

multiply a selected sequence with the modulated symbols to generate a plurality of multiplied sequences;

identify available transmission resources comprised of a plurality of equal duration resource elements in time and frequency domain, with each resource element corresponding to a respective one of a plurality of subcarriers, and a number of the subcarriers being equal to a number of elements within each of the plurality of multiplied sequences;

map the plurality of multiplied sequences into two sets of resource elements in time and frequency domains in a subframe, with a number of resource elements in the two sets being equal to a number of elements of the plurality of multiplied sequences, a first set of the two sets of resource elements being located in one edge of the subframe in the frequency domain and in a first half of the subframe in the time domain, and a second set of the two sets of resource elements being located in an opposite edge of the subframe in the frequency domain and in a second half of the subframe in the time domain; and convert the mapped sequences to radio frequency signals for transmission.

12. The apparatus of claim 11, wherein the control signal is generated by:

mapping the plurality of multiplied sequences into the two sets of resource elements with one element of each multiplied sequence corresponding to one resource element.

13. The apparatus of claim 11, wherein, when identifying the available transmission resources, each resource element is formed with Y subcarriers, each of the plurality of multiplied sequences includes Z elements, and Y/Z=B, where B is a positive integer, and when mapping the plurality of multiplied sequences into the two sets of resource elements, each resource element corresponds to B multiplied sequences.

14. The apparatus of claim 11, wherein the control signal is generated by selecting a subset of multiplied sequences to be mapped into the first set of the two sets of resource elements, with the number of elements of the multiplied sequences within the subset of multiplied sequences being equal to the number of resource elements in the two first set of resource elements, wherein mapping the plurality of multiplied sequences into the two sets of resource elements comprises mapping the multiplied sequences within the subset of multiplied sequences into the two sets of resource elements with each element of a multiplied sequence corresponding to one resource element.

15. The apparatus of claim 14, wherein each multiplied sequence is formed with N bits, and wherein a relationship between the total number of multiplied sequences and a number of bits in each multiplied sequence is established by:

$$M=2^N,$$

where M is the total number of multiplied sequences.

* * * * *